US 6,536,068 B1

(12) United States Patent
Yang et al.

(10) Patent No.: US 6,536,068 B1
(45) Date of Patent: Mar. 25, 2003

(54) TOOTHBRUSHING TECHNIQUE MONITORING

(75) Inventors: Andy Yang, Concord, CA (US); Casper Chiang, Danville, CA (US)

(73) Assignee: Gillette Canada Company, Halifax (CA)

( * ) Notice: Subject to any disclaimer, the term of this patent is extended or adjusted under 35 U.S.C. 154(b) by 0 days.

(21) Appl. No.: 09/474,200

(22) Filed: Dec. 29, 1999

(51) Int. Cl.[7] .................................................. A46B 9/04
(52) U.S. Cl. ...................... 15/105; 15/167.1; 433/216
(58) Field of Search ............................... 15/105, 167.1; 433/216

(56) References Cited

U.S. PATENT DOCUMENTS

| 4,253,212 A | 3/1981 | Fujita |
| 4,435,163 A | 3/1984 | Schmitt et al. |
| 4,598,437 A | 7/1986 | Ernest et al. |
| 4,698,869 A | 10/1987 | Mierau et al. |
| 4,716,614 A | 1/1988 | Jones et al. |
| 4,788,734 A | 12/1988 | Bauer |
| 4,866,807 A | 9/1989 | Kreit et al. |
| 5,088,145 A | 2/1992 | Whitefield |
| 5,134,743 A | 8/1992 | Hukuba |
| 5,146,645 A | 9/1992 | Dirksing |
| 5,331,707 A | 7/1994 | Irizarry |
| 5,339,479 A | 8/1994 | Lyman |
| 5,355,544 A | 10/1994 | Dirksing |
| 5,438,726 A | 8/1995 | Leite |
| 5,467,494 A | 11/1995 | Müller et al. |
| 5,493,747 A | 2/1996 | Inakagata et al. |
| 5,561,881 A | 10/1996 | Klinger et al. |
| 5,673,451 A | 10/1997 | Moore et al. |
| 5,704,087 A | 1/1998 | Strub |
| 5,810,601 A | 9/1998 | Williams |
| 5,815,872 A | 10/1998 | Meginniss, III et al. |
| 5,876,207 A | 3/1999 | Sundius et al. |
| 5,924,159 A * | 7/1999 | Haitin |
| 5,944,531 A | 8/1999 | Foley et al. |
| 6,029,303 A * | 2/2000 | Dewan |
| 6,081,957 A | 7/2000 | Webb |

FOREIGN PATENT DOCUMENTS

| DE | 37 16490 A1 | 11/1988 |
| DE | 298 12 651 U1 | 3/1999 |

OTHER PUBLICATIONS

Allen C. eta al, An Instrument for measuring toothbrushing force using PIC microcontroller technology, Proceedings of the International Conference on Industrial Electronics, control, and Instrumentation(IECON), US, New York, IEEE, vol. Conf. 21, Nov. 6, 1995, pp. 861–866.

* cited by examiner

Primary Examiner—Randall E. Chin
(74) Attorney, Agent, or Firm—Fish & Richardson P.C.

(57) ABSTRACT

Methods for monitoring toothbrush technique are provided, for example a method including, while a toothbrush user is brushing his teeth, acquiring data indicative of motion of the toothbrush along its longitudinal axis, and, providing information about the data for display. Devices and systems for monitoring toothbrushing technique are also provided.

24 Claims, 22 Drawing Sheets

|  | Left | Center | Right |
|---|---|---|---|
| Horiz. Motion (%) | 14 | 5 | 22 |
| Vert. Motion (%) | 10 | 18 | 9 |
| Circ. Motion (%) | 76 | 78 | 69 |
| Avg. Force (gm) | 738 | 684 | 749 |
| Duration (sec) | 53 | 49 | 36 |
| Score / Region | 87 | 89 | 83 |
| Your Grade For This Session [B] | | | |

FIG. 6B

| Time | X-Axis | Y-Axis | | |
|---|---|---|---|---|
| 0 | -2.714 | 1.249 | | |
| 0.05 | -1.682 | 2.797 | | |
| 0.1 | 2.817 | 1.536 | | |
| 0.15 | 4.737 | -1.33 | MAX | 1st Stroke |
| 0.2 | 1.069 | -1.731 | | |
| 0.25 | -0.049 | -2.103 | | |
| 0.3 | -3.086 | -0.957 | MIN | |
| 0.35 | -1.768 | 0.562 | | |
| 0.4 | -0.679 | 2.31 | | |
| 0.45 | 2.903 | 2.138 | | |
| 0.5 | 3.676 | -1.53 | MAX | 2nd Stroke |
| 0.55 | 0.754 | -1.989 | | |
| 0.6 | -0.479 | -2.533 | | |
| 0.65 | -2.169 | -0.814 | MIN | |
| 0.7 | -1.883 | 1.651 | | |
| 0.75 | -1.453 | 2.739 | | |
| 0.8 | 2.244 | 1.221 | | |
| 0.85 | 3.361 | -1.129 | MAX | 3rd Stroke |
| 0.9 | 2.014 | -2.103 | | |
| 0.95 | -0.421 | -2.333 | | |
| 1 | -4.318 | 0.046 | MIN | |
| 1.05 | -1.911 | 0.619 | | |
| 1.1 | -0.364 | 2.195 | | |
| 1.15 | 4.794 | 2.052 | MAX | 4th Stroke |
| 1.2 | 3.361 | -1.817 | | |
| 1.25 | 1.155 | -2.447 | | |
| 1.3 | -1.596 | -1.788 | | |
| 1.35 | -2.771 | -0.069 | MIN | |
| 1.4 | -1.281 | 1.88 | | |
| 1.45 | 0.61 | 2.166 | | |
| 1.5 | 2.903 | 0.619 | | |
| 1.55 | 1.843 | -0.613 | | |
| 1.6 | 1.986 | -2.619 | | |
| 1.65 | -2.284 | -1.272 | | |
| 1.7 | -3.545 | 0.59 | | ⇓ |
| 1.75 | -2.198 | 1.908 | | CONTINUE |
| 1.8 | 1.241 | 2.023 | | |
| 1.85 | 3.648 | 0.246 | | |
| 1.9 | 0.754 | -0.756 | | |
| 1.95 | -0.307 | -2.132 | | |
| 2 | -1.825 | -1.502 | | |
| 2.05 | -2.714 | 0.762 | | |
| 2.1 | -0.736 | 2.31 | | |
| 2.15 | 1.298 | 2.51 | | |
| 2.2 | 3.848 | -0.384 | | |
| 2.25 | 0.324 | -1.272 | | |
| 2.3 | 0.295 | -2.304 | | |
| 2.35 | -2.972 | -0.814 | | |
| 2.4 | -2.742 | 0.39 | | |
| 2.45 | -1.166 | 2.31 | | |
| 2.5 | 1.728 | 2.023 | | |

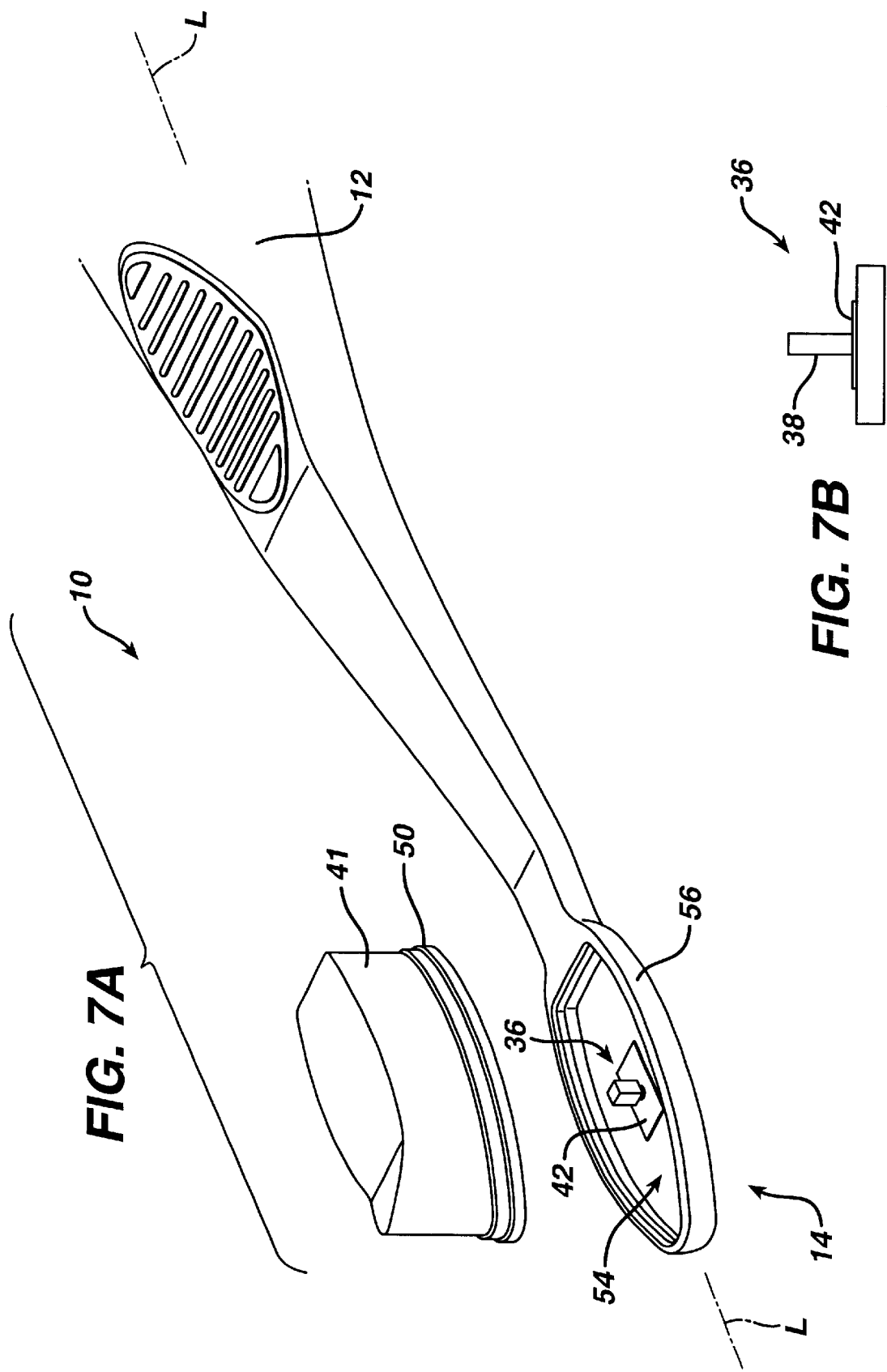

FIG. 8D

| Time | X-Axis | max/min | | Array A | Time | Y-Axis | max/min | | Array B | Array C |
|---|---|---|---|---|---|---|---|---|---|---|
| 7.000 | 0.450 | | | | 7.000 | 1.553 | | | | 1 |
| 7.020 | 0.463 | | | | 7.020 | 1.206 | | | | 2 |
| 7.040 | 0.522 | | | | 7.040 | 1.006 | | | | 3 |
| 7.060 | 0.756 | | | | 7.060 | 0.875 | | | | 4 |
| 7.080 | 0.966 | | | | 7.080 | 0.875 | Ymin | | | 1 |
| 7.100 | 1.016 | | | | 7.100 | 0.897 | | | | 2 |
| 7.120 | 1.172 | | | | 7.120 | 0.919 | | | | 3 |
| 7.140 | 1.244 | Xmax | ← → | 1 | 7.140 | 1.128 | | | | 4 |
| 7.160 | 1.169 | | | | 7.160 | 1.234 | | | | • |
| 7.180 | 1.113 | | | | 7.180 | 1.347 | | | | • |
| 7.200 | 1.103 | | | | 7.200 | 1.472 | | | | • |
| 7.220 | 1.034 | | | | 7.220 | 1.575 | | | | • |
| 7.240 | 1.022 | | | | 7.240 | 1.594 | | | | |
| 7.260 | 0.934 | | Lx>0.8 | | 7.260 | 1.763 | | | | |
| 7.280 | 1.000 | | | | 7.280 | 2.000 | | | | |
| 7.300 | 0.775 | | | | 7.300 | 2.103 | | | | |
| 7.320 | 0.559 | | | | 7.320 | 2.203 | | | | |
| 7.340 | 0.444 | | | | 7.340 | 2.284 | | | | |
| 7.360 | 0.438 | | | | 7.360 | 2.291 | Ymax | ← → | 2 | |
| 7.380 | 0.384 | Xmin | ← → | 3 | 7.380 | 2.066 | | | | |
| 7.400 | 0.397 | | | | 7.400 | 1.825 | | | | |
| 7.420 | 0.419 | | | | 7.420 | 1.541 | | | | |
| 7.440 | 0.541 | | | | 7.440 | 1.291 | | Ly>0.6 | | |
| 7.460 | 0.631 | | | | 7.460 | 1.000 | | | | |
| 7.480 | 0.794 | | | | 7.480 | 0.900 | | | | |
| 7.500 | 1.000 | | | | 7.500 | 1.100 | | | | |
| 7.520 | 1.091 | | | | 7.520 | 1.038 | | | | |
| 7.540 | 1.141 | | | | 7.540 | 1.038 | Ymin | ← → | 4 | |
| 7.560 | 1.156 | | | | 7.560 | 1.159 | | | | |
| 7.580 | 1.178 | | | | 7.580 | 1.325 | | | | |
| 7.600 | 1.203 | Xmax | ← → | 1 | 7.600 | 1.413 | | | | |
| 7.620 | 1.063 | | | | 7.620 | 1.475 | | | | |
| 7.640 | 0.997 | | | | 7.640 | 1.591 | | | | |
| 7.660 | 1.000 | | | | 7.660 | 1.625 | | | | |
| 7.680 | 0.950 | | | | 7.680 | 1.856 | | | | |
| 7.700 | 0.938 | | | | 7.700 | 1.950 | | | | |
| 7.720 | 0.700 | | Lx>0.8 | | 7.720 | 2.041 | | | | |
| 7.740 | 0.581 | | | | 7.740 | 2.200 | | | | |
| 7.760 | 0.481 | | | | 7.760 | 2.284 | Ymax | ← → | 2 | |
| 7.780 | 0.419 | | | | 7.780 | 2.219 | | | | |
| 7.800 | 0.359 | Xmin | ← → | 3 | 7.800 | 2.009 | | | | |
| 7.820 | 0.372 | | | | 7.820 | 1.675 | | Ly>0.6 | | |
| 7.840 | 0.450 | | | | 7.840 | 1.422 | | | | |
| 7.860 | 0.594 | | | | 7.860 | 1.144 | | | | |
| 7.880 | 0.669 | | | | 7.880 | 0.916 | | | | |
| 7.900 | 0.891 | | | | 7.900 | 0.856 | Ymin | ← → | 4 | |
| 7.920 | 1.081 | | | | 7.920 | 1.116 | | | | |
| 7.940 | 1.147 | | | | 7.940 | 1.138 | | | | |
| 7.960 | 1.113 | | | | 7.960 | 1.219 | | | | |
| 7.980 | 1.109 | | | | 7.980 | 1.306 | | | | |
| 8.000 | 1.203 | Xmax | | | 8.000 | 1.441 | | | | |

TOOTHBRUSHING TECHNIQUE MONITORING

BACKGROUND

The invention relates to toothbrushing technique monitoring.

The effectiveness of toothbrushing in removing plaque from tooth surfaces is affected by the user's brushing motion, brushing duration, and the force applied by the user during brushing. These parameters have been integrated by dental professionals to form a "recommended brushing technique" which is taught to dental patients during visits to the dentist. However, once the patient leaves the dentist's office, this technique is often forgotten, and poor brushing technique is used instead. Moreover, if the dentist asks the patient to demonstrate the patient's brushing technique, such a demonstration is often not representative of the patient's usual technique.

Various toothbrushes have been proposed which measure one or more of the three parameters discussed above and provide a signal (e.g., a sound or light) when these parameters are not within predetermined optimal ranges. Other toothbrush systems monitor one or more of these parameters and provide a graph that plots the raw data obtained during monitoring.

SUMMARY

The invention provides a toothbrush user and/or the user's dentist with an accurate evaluation of the user's brushing technique during a brushing session. The invention acquires a time sequence of data regarding the user's brushing motion, force and duration during brushing, stores the data, and then analyzes it. A user interface allows the toothbrush user and/or the user's dentist to view a simulation of a brushing session. Data from multiple brushing sessions may be stored so that a history of the patient's brushing technique and regimen can be compiled and studied.

In one aspect, the invention features a method including, while a toothbrush user is brushing his teeth, acquiring data indicative of motion of the toothbrush along its longitudinal axis, and, providing information about the data for display.

Preferred implementations of the method include one or more of the following features. The method further includes acquiring data indicative of motion of the toothbrush in at least two degrees of freedom, more preferably at least 4 degrees of freedom and most preferably six degrees of freedom. The method further includes acquiring data indicative of pressure applied along the shafts of the bristles. The data indicative of motion is acquired independently of the pressure data. The data indicative of motion is acquired from a location in the vicinity of the bristles, e.g., from an elongated member having a longitudinal axis that is disposed at an angle of 0 to 45 degrees with respect to the shafts of at least some of said bristles. The data is acquired by measuring strain as the elongated member is deflected during brushing. The method further includes analyzing the data to determine the brushing motion of each brushstroke. The information is displayed to a dentist and/or to the user of the toothbrush, or the information is used in clinical or market research. The information includes detail about brushing motions used during brushing, relates to brush wear, and/or relates to brushing pressure. The information is used to control movement of a graphical element, representative of a toothbrush, in accordance with the data. The information includes detail about how much brushing occurred on the left, right and front teeth.

In another aspect, the invention features a system for monitoring a toothbrushing technique of a user, including (a) a toothbrush constructed to acquire a time sequence of data, indicative of a changing two-dimensional position of bristles of the toothbrush in a plane that is generally perpendicular to shafts of the bristles of the toothbrush, and (b) a user interface constructed to display information concerning the brushing motions of the user.

Preferred implementations of this aspect of the invention may include one or more of the following features. The system further includes a data storage device associated with the toothbrush and constructed to store the data acquired by the toothbrush. The user interface is constructed to provide an evaluation of the user's brushing technique based on said data. The toothbrush includes the user interface, or the user interface is provided on a toothbrush holder. The user interface includes a display for indicating a rating. The toothbrush includes a modem, e.g., a wireless modem, for transmitting the data to a remote computer. The user interface includes a display including a first graphical element, representative of a toothbrush, that moves in accordance with the data. The display further includes a second graphical element, representative of a set of teeth, that remains static relative to the first graphical element. The first graphical element appears to move in any of six degrees of freedom. The toothbrush includes a sensor and a microprocessor.

In another aspect, the invention features a toothbrush including a handle, a neck, and a brush region extending from the neck, the brush region including brushing elements extending from a base, and a motion sensor disposed in the brush region.

Preferred implementations include one or more of the following features. The brush region further includes a back portion, the sensor is mounted on the back portion, and the base is removably mounted on a portion of the sensor extending from the back portion. The brushing elements and the base together comprise a removable modular unit. The modular unit is replaceable. The sensor is permanently mounted on the toothbrush, and the modular unit removably engages a portion of the sensor. Alternatively, the sensor includes an elongated member that extends between the brushing elements, e.g., a portion of the elongated member extends through an aperture in the base and into the brushing elements. The brushing elements comprise bristles and the longitudinal axis of the elongated member extends at an angle of from about 0 to 45 degrees with respect to the long axes of at least some of the bristles. The sensor includes a bristle-like element. The toothbrush further includes a rotation sensor, e.g., a gyroscope, constructed to measure rotation of the toothbrush. The motion sensor is constructed to measure a bending moment of the elongated member when force is applied by the user to the teeth during brushing. The motion sensor measures bending moments in multiple directions. The toothbrush further includes a data storage device for storing data that is sensed by the sensor. The toothbrush further includes a modem, e.g., a wireless modem, for transmitting data that is sensed by the sensor to a remote computer. The toothbrush further includes a data evaluation device constructed to analyze the data. The toothbrush further includes a display for displaying information regarding a brushing session. The toothbrush further includes a microprocessor connected to the sensor.

In another aspect, the invention features a method including displaying a first graphical element representative of a toothbrush; and causing the first graphical element to move in accordance with data that represents actual motion of a toothbrush held by a user.

In preferred implementations, the display further includes a second graphical element, representative of a set of teeth, that remains static and is positioned relative to the first graphical element so that the first element appears to be moving over the second element.

In a further aspect, the invention features a method for evaluating a toothbrush user's toothbrushing technique including (a) while a toothbrush user is brushing his teeth, acquiring data associated with the user's toothbrushing; (b) storing data acquired during the toothbrushing step; (c) analyzing the data to obtain an evaluation of the movement of the brush and, independently, the pressure exerted on the teeth; and (d) providing information about the evaluation for display.

In another aspect, the invention features a toothbrush including a body, and a sensor constructed to generate a time sequence of data associated with orientation of the toothbrush in enough degrees of freedom to enable a determination of the motion of the toothbrush independently of the force applied by a user to teeth during brushing.

In yet another aspect, the invention features an apparatus including (a) an input configured to receive a time sequence of data associated with orientation of a toothbrush during brushing, and (b) an analytical device that determines the contour of the motion of the toothbrush based on said data.

In a further aspect, the invention features a machine-based user interface that includes a display of a toothbrush in a 3D world, and a device that controls apparent motion of the toothbrush in the 3D world in accordance with data about orientation of a real toothbrush derived during toothbrushing.

In another aspect, the invention features a toothbrush including (a) a brush portion for brushing the teeth; (b) a brushing evaluation device; and (c) a display, for displaying information generated by the brushing evaluation device.

In preferred implementations, the information includes detail about brushing motions used during brushing, brushing pressure and brush wear. The display may also indicate when the brush portion should be replaced.

In a further aspect, the invention features a toothbrush that includes a replaceable brush portion, a data acquisition device constructed to acquire and store data pertaining to brushing pressure, duration, and number of brushstrokes, and an indicator constructed to evaluate the data and indicate to a user of the toothbrush when the brush portion should be replaced.

The invention also features other methods and devices for monitoring toothbrushing technique.

Other features and advantages will be apparent from the following description and from the claims.

BRIEF DESCRIPTION OF THE DRAWINGS

FIG. 6B is an array of spreadsheet data marked to indicate brushstrokes.

FIG. 7A is an exploded perspective view of the toothbrush head shown in FIG. 7, with the bristles shown schematically.

FIG. 7B is a side view of the multi-axis force sensor used in the toothbrush of FIG. 7.

FIG. 8D is an array of data generated using the algorithm shown in FIG. 8.

DESCRIPTION

Figure 1:
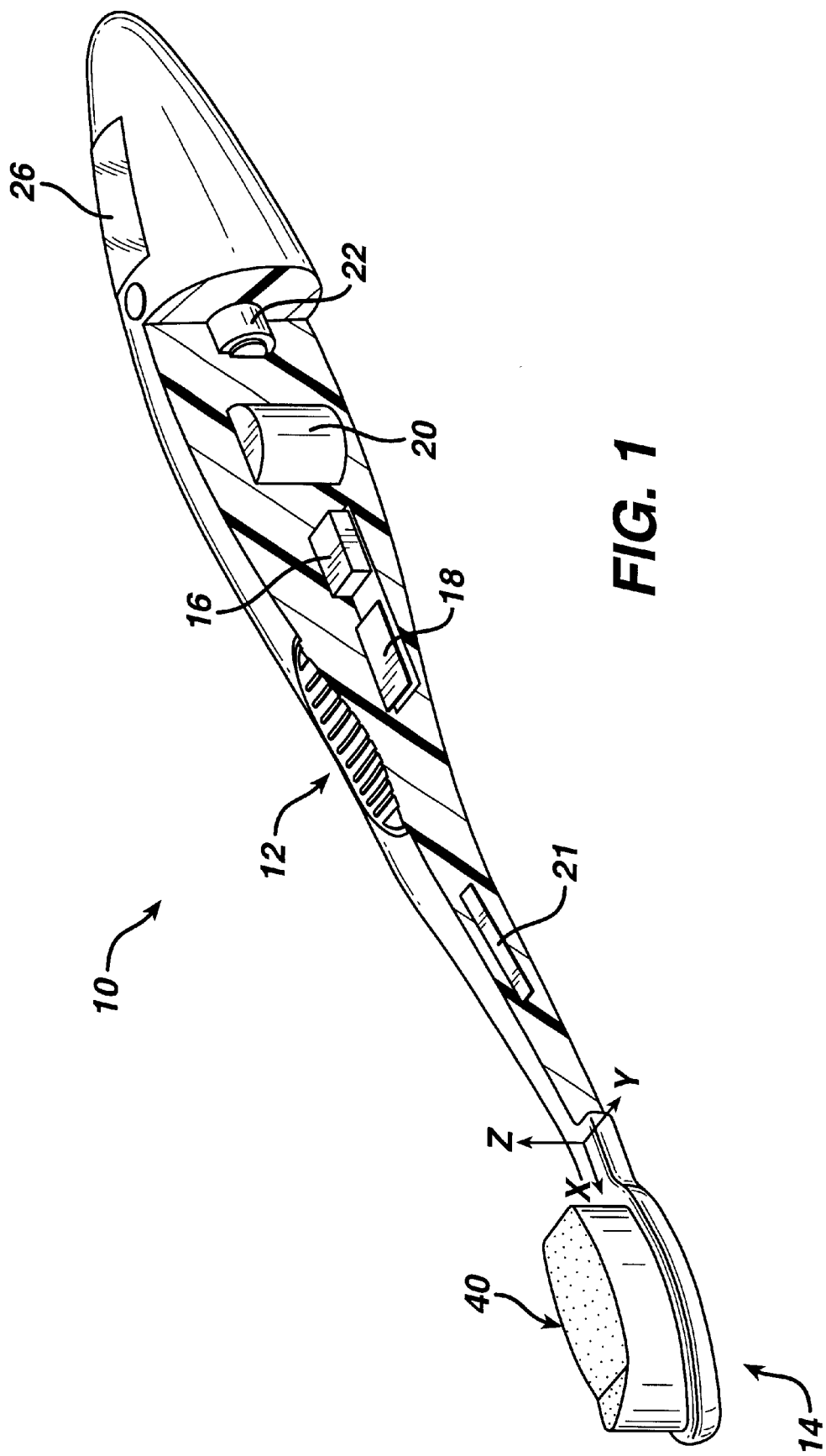
FIG. 1 is a perspective view, in partial cross-section, of a toothbrush according to one embodiment of the invention.
Figure 2:
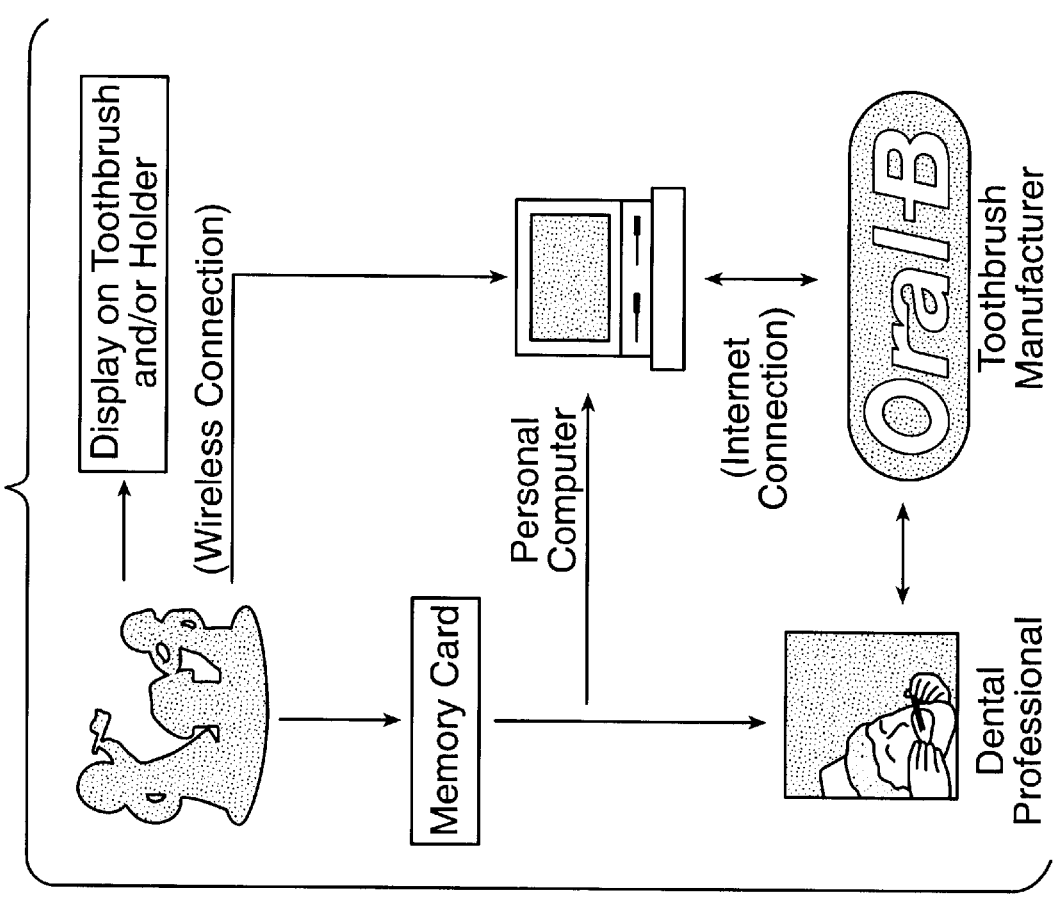
FIG. 2 is a schematic diagram of the flow of data from a toothbrush or toothbrush stand to one or more remote locations.

A toothbrush, for use in a system for monitoring toothbrushing technique, is shown in FIG. 1. The toothbrush 10 includes a handle 12 and a brush head 14 that generally includes bristles 40 arranged in tufts.

Within the handle 12 is mounted a motion sensor 16, a microprocessor 18, a data storage device 20, e.g., a memory card, and a power supply 22, e.g., a battery, connected as shown in FIG. 1. The toothbrush 10 also includes a strain gage 21, mounted in the neck of the toothbrush. The manner in which data is acquired during toothbrushing and subsequently evaluated will be discussed in further detail below.

Figure 1A:
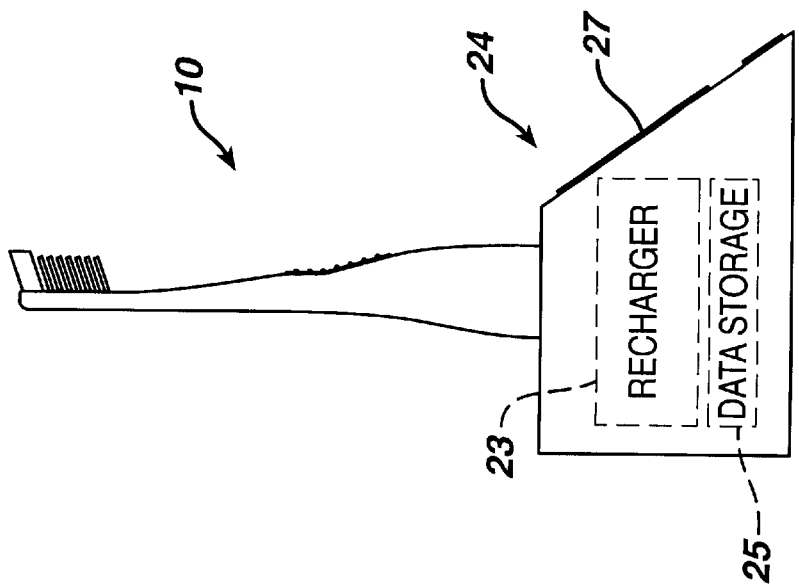
FIG. 1A is a diagrammatic side view of the toothbrush of FIG. 1 stored in a toothbrush holder.
Figure 3:
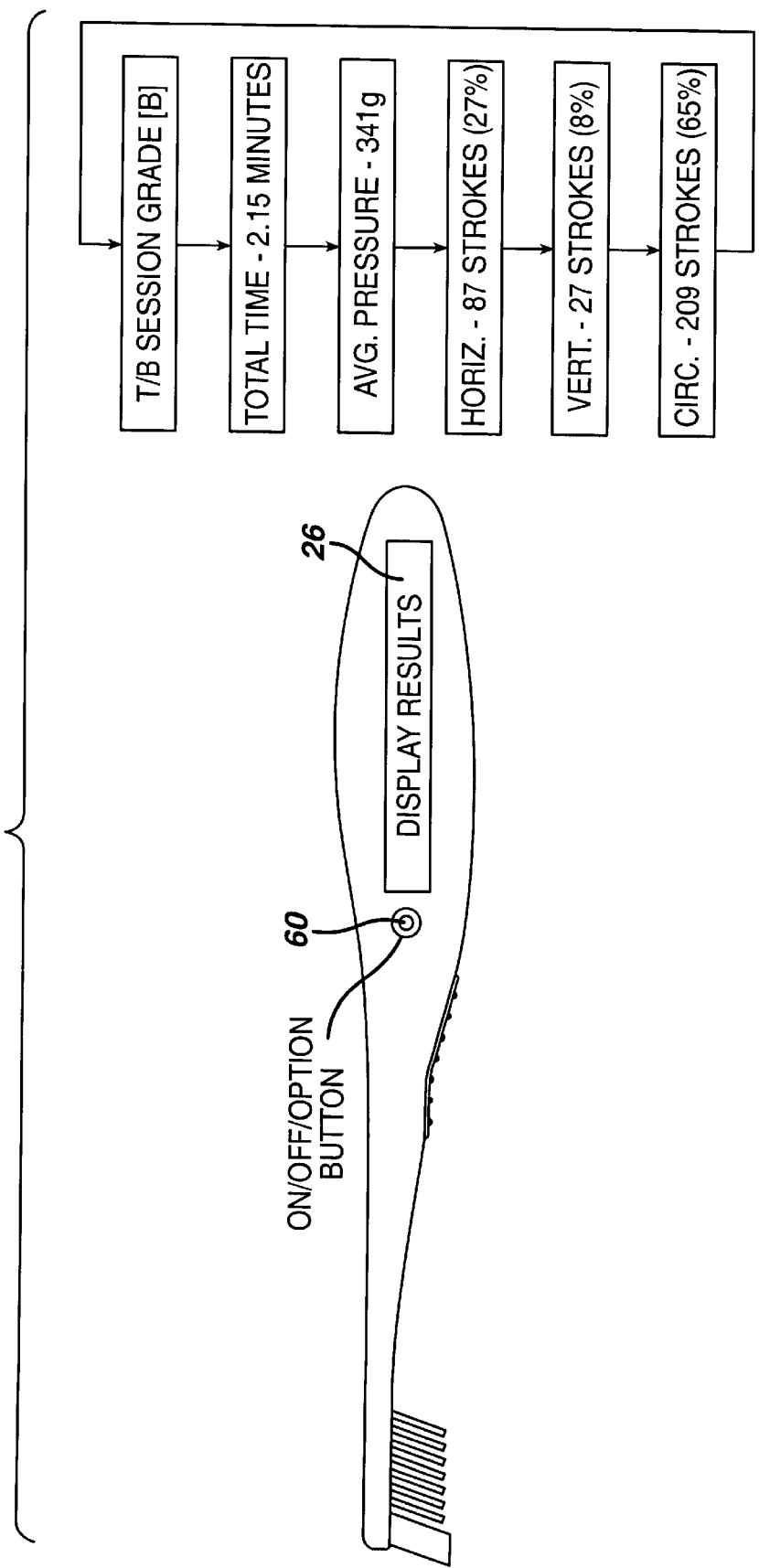
FIG. 3 is a side view of a toothbrush showing a LCD or LED display with boxes indicating information that can be displayed to a user.
Figure 4:
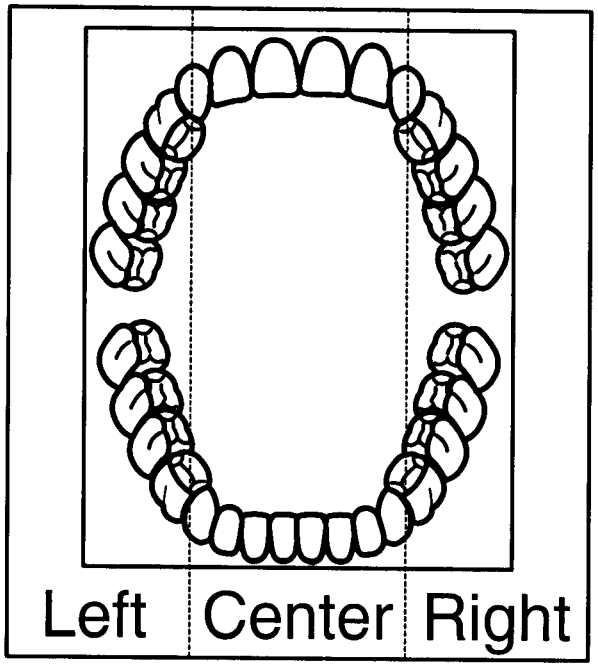
FIG. 4 shows a larger display that can be viewed, e.g., on a LCD or LED display on a toothbrush holder, or on a personal computer screen.

As shown in FIG. 1A, the system may also include a toothbrush holder 24 in which the toothbrush may be stored when not being used for brushing. If the power supply 22 includes a rechargeable battery, the toothbrush holder 24 includes a recharger 23 constructed to serve as a recharging station for the power supply and includes a plug (not shown) to connect it to an electrical outlet. The holder also includes a display 27, e.g., a LCD, to provide a read-out for display of information concerning, for example, an evaluation of the user's toothbrushing technique, e.g., a "grade" indicating how well brushing was performed. Examples of possible displays are shown in FIGS. 3 and 4. The holder further includes a data storage device 25, into which data can be downloaded from the toothbrush, e.g., if the data storage in the toothbrush is limited or temporary. The holder and/or the toothbrush may also include a wireless modem (not shown) via which the data and/or evaluation can be transmitted to a remote location, e.g., a personal computer or an Internet website.

The three steps performed by the toothbrushing technique monitoring in some embodiments of the invention are (a) acquisition, during a brushing session, of a time sequence of data, for example, data associated with motion of the toothbrush in enough degrees of freedom to enable a determination of the motion of the toothbrush and data associated with a force applied by a user to teeth during brushing, (b) analysis of the time sequence of data to make this determination and obtain any other desired information, and (c) output of the results of step (a) and/or (b) to the toothbrush user or another person, e.g., a dentist or other oral care professional. These steps will be discussed in detail below.

Data Acquisition

Various sensor arrangements can be used to acquire the time sequence of data concerning the motion of the toothbrush and applied force. Two alternative arrangements will be discussed below.

As shown in FIG. 1, the toothbrush 10 includes a motion sensor 16, e.g., a multi-axis accelerometer, and a strain gage 21. The multi-axis accelerometer may be a two-axis or three-axis accelerometer, and is used to measure acceleration in the x and y directions, i.e., movement of the toothbrush in the plane of the toothbrush head, as a function of time. When a substantially constant current is supplied to the accelerometer, e.g., by a 5 volt battery, the resistance of the accelerometer changes in response to motion, resulting in a varying voltage output, according to the equation V=IR. Suitable accelerometers are available from Vernier Software of Portland, Oreg. Strain gage 21 is mounted in the neck of the toothbrush, and measures force applied to the toothbrush bristles, i.e., force in a z direction. Acceleration and force data are acquired by the microprocessor at a data acquisition rate (sampling rate) of from about 10 to 50 samples/second, e.g., about 20 samples/second. The acceleration data is used to infer motion, using an algorithm discussed below; it is not converted to position data.

In this embodiment, because the sensors and strain gage are not in the head region, the head can be removable and replaceable, e.g., by threaded engagement with the handle (not shown), so that the brush can continue to be used after bristle wear has occurred. Any desired type of removable head or bristle cartridge can be used.

Figure 7:
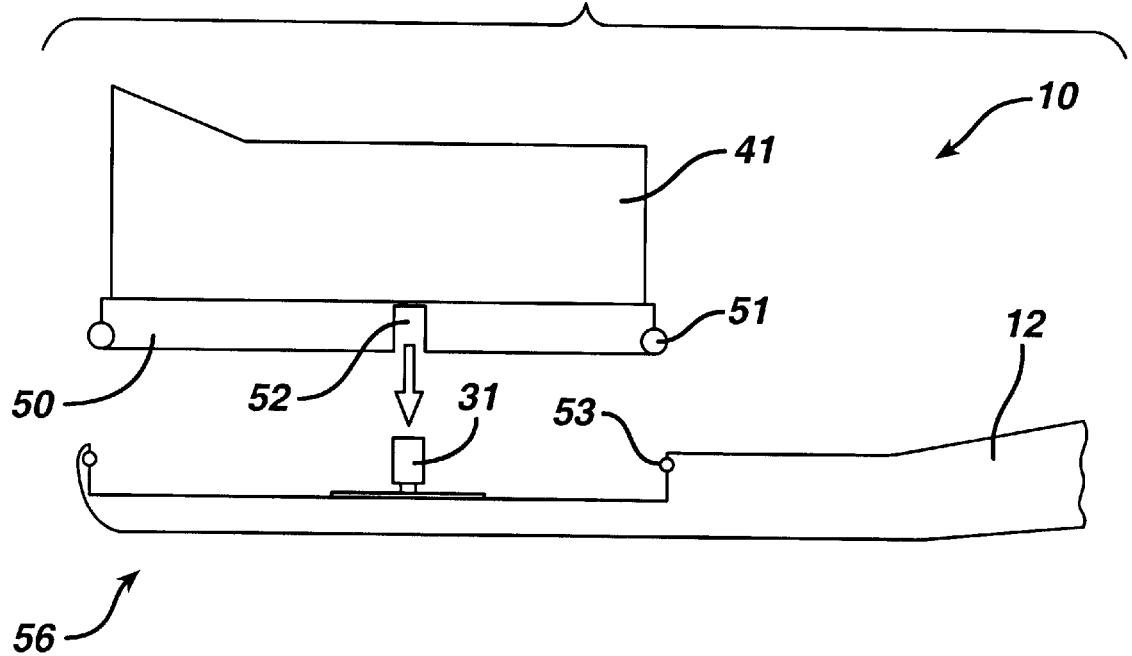
FIG. 7 is an exploded diagrammatic side view of the head portion of a toothbrush according to an alternate embodiment of the invention.
Figure 7C:
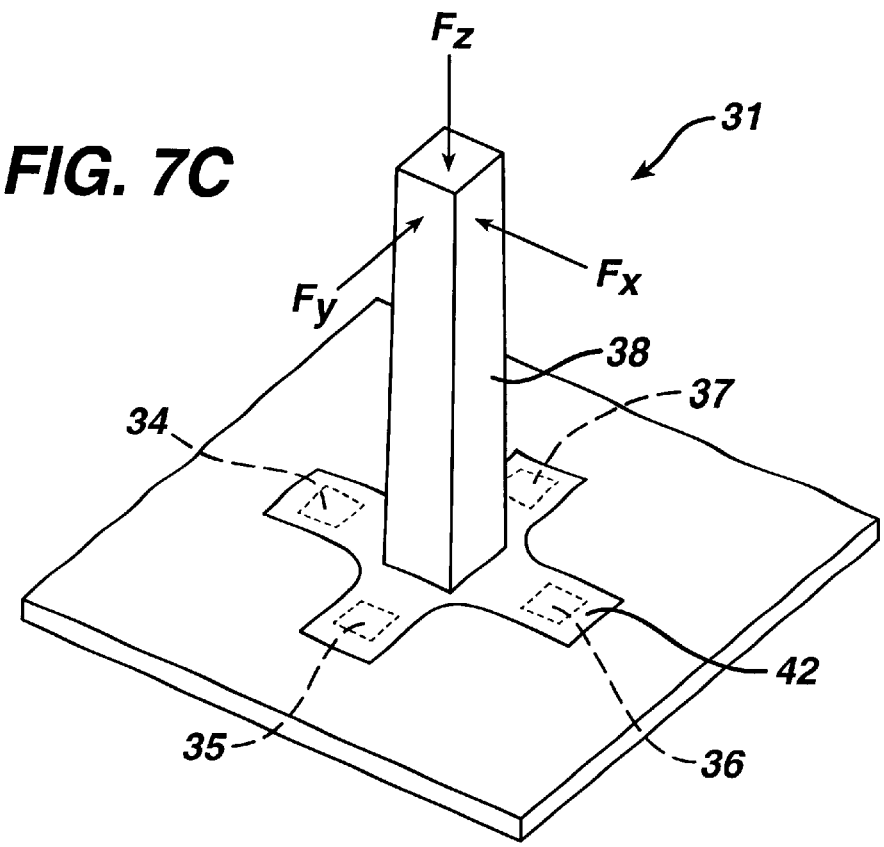
FIG. 7C is a partial enlarged perspective view of the force sensor shown in FIG. 7B.

Alternatively, as shown in FIGS. 7–7A, the toothbrush 10 can include, instead of the accelerometer and strain gage, a three-dimensional force sensor 31 that is similar to the sensor used in a pointing device embedded among the keys on a portable computer keyboard. Suitable force sensors are available from Bokam Engineering, Inc., of Santa Ana, Calif., under the tradename Aurora/DX series sensors and described in U.S. Pat. No. 5,872,320, the full disclosure of which is hereby incorporated by reference herein. Sensor 31, shown in detail in FIGS. 7B and 7C, includes a post 38 that extends upwardly from the toothbrush head, substantially perpendicular to the longitudinal axis 41 of the toothbrush handle (and substantially parallel to the shafts (not shown) of the bristles 40). Sensor 31 further includes a sensing element 42 mounted at the base of the post.

A preferred sensing element 42 includes five strain gages, two of which measure movement in the x direction, two of which measure movement in the y direction, and the fifth of which measures pressure in the z direction. The four strain gages that measure movement are positioned underneath the four corners of the sensing element 42 (gages 34, 35, 36, 37, FIG. 7C). The fifth strain gage, which measures pressure, is mounted directly under the post 38, and thus is not shown. Strain is detected when post 38 is deflected, even very slightly, causing the sensing element 42 to apply a force to one or more of the strain gages. Because of the inclusion of the fifth strain gage, the sensor is capable of measuring z-axis pressure (pressure exerted by the bristles on the teeth) independently of pressure on the x and y axes (indicative of motion). As a result, the sensor provides accurate measurements of brushing motion that are independent of brushing pressure. Thus, the sensor can accurately and consistently distinguish between vertical (or horizontal) motion of the brush over the teeth and changes in pressure of the brush against the teeth that do not involve movement.

As shown in FIGS. 7 and 7A, in this embodiment the bristles 41 are mounted on a module 50 having a portion 52 that press or snap fits onto the post 38 (arrow, FIG. 7), allowing the module to be replaced. Sensing element 42 is disposed within a cavity 54 that is defined by the module 50 and the head region 56 of handle 12, to protect the sensing element. The motion of the module relative to the head region is possible because of a gap between the inner perimeter of the cavity 54 and the outer perimeter of the module. The motion is cushioned by a gasket 51 extending around the periphery of the module, and a gasket 53 extending around the periphery of the cavity in the head region. Because the sensor measures the movement of the module in the three directions relative to the head region, rather than the movement of the handle and/or the bending moments of the neck, the data obtained accurately represents brushing motion. For example, non-brushing motion/pressure, such as static pressure on the head, or movement of the handle through space (without brushing), is not erroneously reported to the user as motion. In this embodiment, data is obtained at a data acquisition rate of about 25–75 samples/second, e.g. about 50 samples/second.

In both of the embodiments discussed above, brushing duration is determined based on when the device is manually turned on and off using an on/off switch (not shown). If desired, the device may be continuously on, in a "sleep" mode when not in use. In this case, the device can be constructed to be activated (switched to "wake" mode) by brushing pressure or by manually switching the device on. In the former case, the device can be constructed to begin acquiring data when brushing pressure is first detected and tabulate the data when brushing pressure has not been detected for a predetermined period of time, e.g., 30 seconds.

Figure 9:
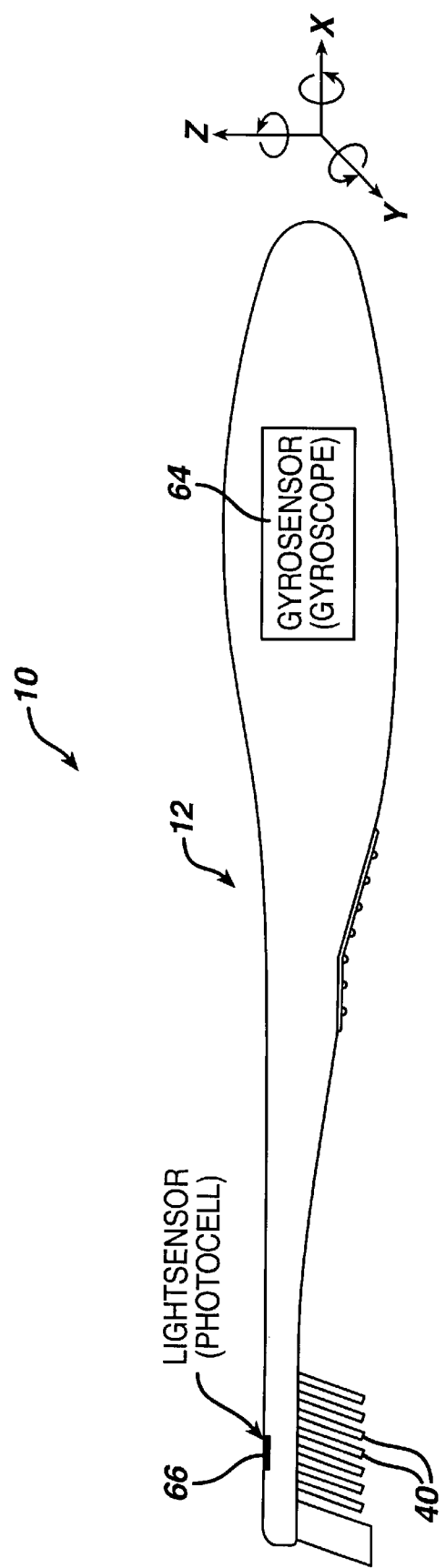
FIG. 9 is a diagrammatic side view of a toothbrush including a gyrometer and light sensor.

In either of the toothbrushes shown in FIGS. 1 and 7–7A, a gyroscope 64 may be included as shown in FIG. 9, in order to detect rotational motions of the toothbrush about the x, y and z axes. The data acquired by the gyroscope can be used to determine when the user moves the toothbrush from one side of the mouth to the other (movement from one side to the other is inevitably accompanied by flipping the toothbrush over). This data can be used to determine brushing duration on each side of the mouth, as discussed below. The gyroscope data can also be used to determine when the gums are being brushed, as during gum brushing most users hold the brush head at an angle of approximately 45 degrees from the normal toothbrushing position (bristles approximately horizontal). This gum-brushing data can also be used to determine whether during a particular time period, the top teeth or bottom teeth were being brushed, by determining whether, when the gums were brushed during that period, the angle was about 45 degrees or about −45 degrees.

The toothbrush may also, optionally, include a sensor for determining when the front teeth are being brushed (rather than the left or right side of the mouth). This sensor may be, e.g., a light sensor 66 (FIG. 9) mounted on the back of the toothbrush head (so that it will be covered by the user's cheek when inside the mouth, but exposed to light while the front teeth are being brushed) or a similarly mounted pressure sensor that will contact the cheek when the brush is in the mouth but not during brushing of the front teeth.

The data acquired by the sensors described above is fed through a data acquisition book (DAQ book). The DAQ book, not shown separately in the figures, may be embedded in a chip in the microprocessor, or may be a separate component cabled to the toothbrush. Suitable cabled DAQ books are commercially available e.g., from Vernier Software. The DAQ book can be used as purchased, without any modification or programming other than calibration. The DAQ book converts the digital data to a tabular form, allowing it to be scanned into a table in a conventional data acquisition software program, e.g., spreadsheet software such as is commercially available from Microsoft under the tradename Excel. An example of a spreadsheet is shown in FIG. 6A, with a graph showing the coordinates of the data in the spreadsheet. The data is stored and tabulated in chronological order, always maintaining the time sequence in which the data was acquired during brushing. The tabulated data is then used to generate a time sequence of data indicating the brushing motion used for each brushstroke during the brushing session, as will be discussed below in the "Data Analysis" section.

Data Analysis

The data acquired by the accelerometer or multi-axis force sensor is analyzed, as will be discussed below, in order to determine the motion of each brushstroke during the brushing session (i.e., horizontal vertical or circular). The data regarding brushing duration and brushing force typically does not require any analysis, other than to compare this data, if desired, to a predetermined recommended brushing duration and force and determine if the duration and/or force should be increased or decreased. The amount of bristle wear can also be derived by combining data indicating pressure, duration and total number of strokes. Reporting this parameter to the user could signal to the user when the brush head should be replaced.

Figure 5:
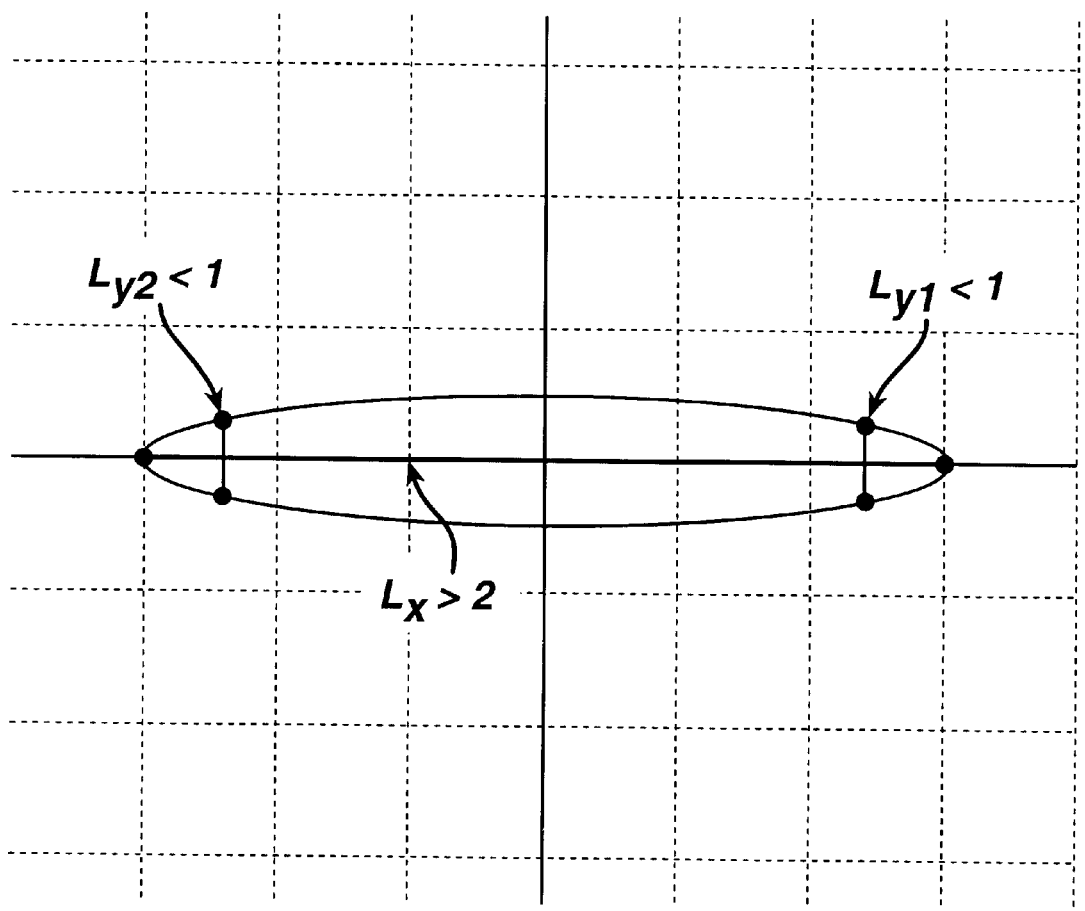
FIGS. 5–5B are graphs of the x-y coordinates of the positions of the toothbrush during motion that is generally respectively horizontal, vertical, and circular.
Figure 5A:
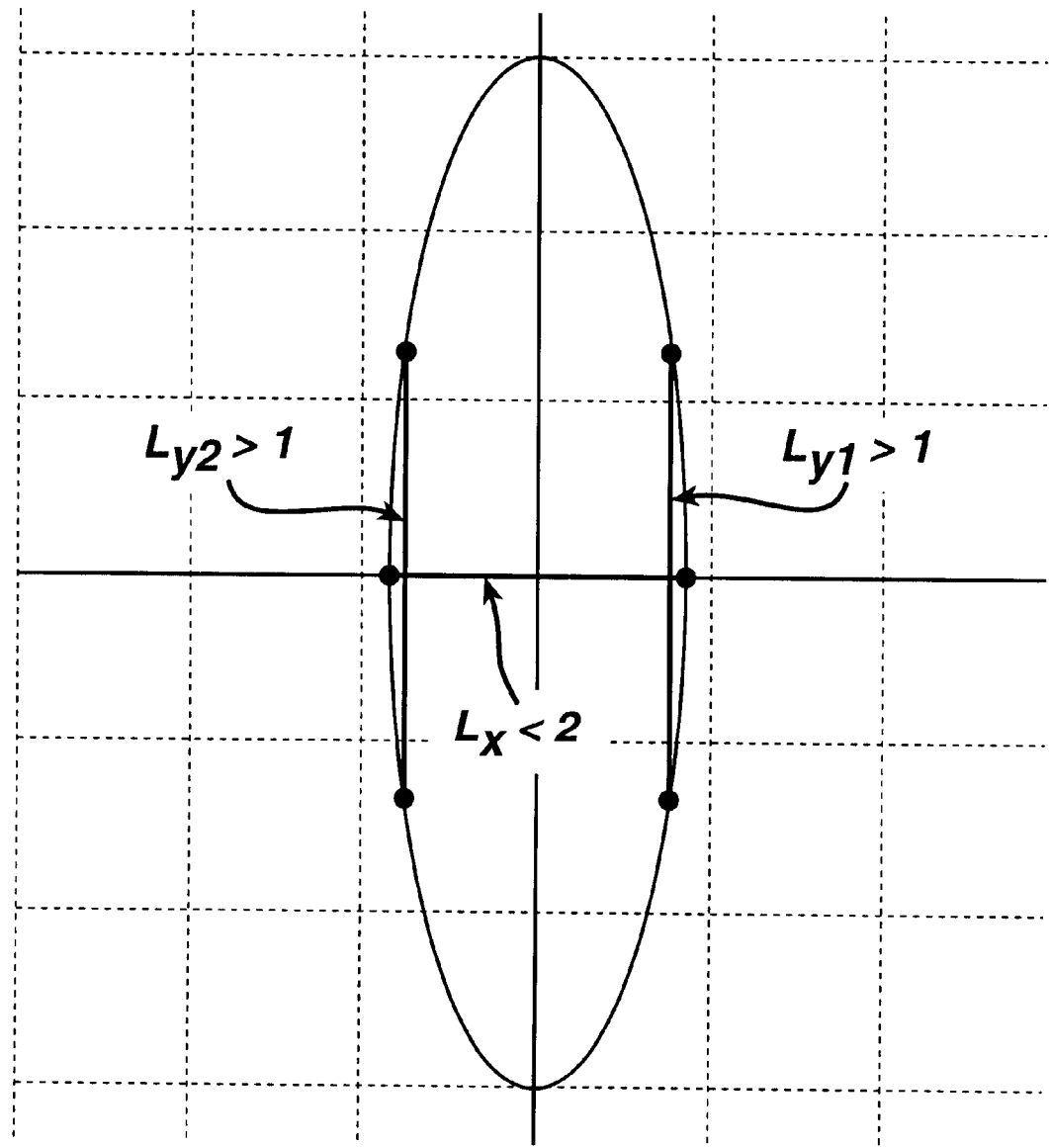
FIG. 5C is a similar graph, indicating the positions of $X_{max}$, $X_{min}$, $Y_{max}$ and $Y_{min}$.
Figure 5B:
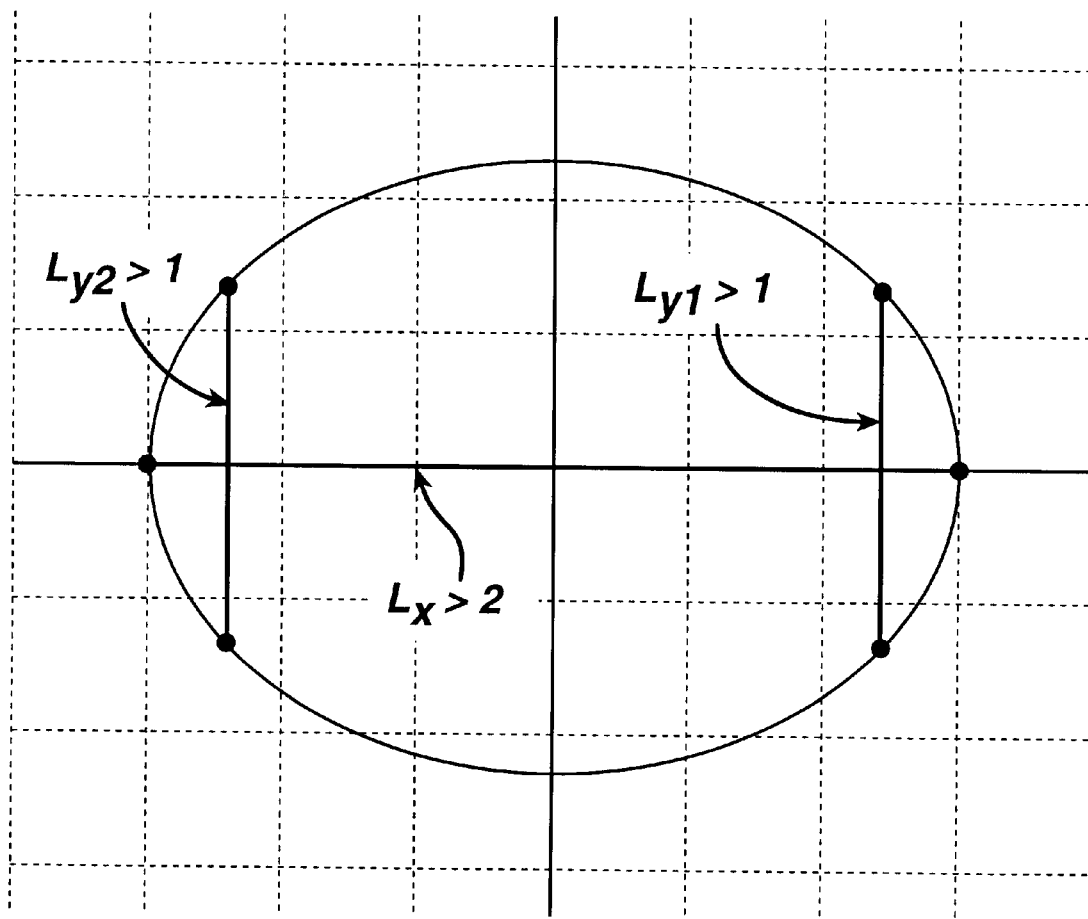

When the sensor configuration shown in FIG. 1 is used, it is necessary to perform a series of calculations with the x and y acceleration coordinates in order to determine the sequence of brushing motions used during the brushing session. For reference during the following discussion, graphs showing typical x,y coordinates for a horizontal, vertical and circular stroke are shown in FIGS. 5–5B. The data acquisition rate is fast enough so that there are many data points on the curves in FIGS. 5–5B. For clarity, the data points of interest are the only ones that are indicated on the figures. The data points of interest are shown as being symmetrical about the x and y axes, for clarity, but this is not always the case with actual data.

The sensors are calibrated, based on experimental data. One cycle of horizontal motion will generally have maximum and minimum x values of 1,−1 or greater (so that the distance between $x_{max}$ and $x_{min}$ is greater than 2), and maximum and minimum y values of considerably less than 1−1. Vertical motion will exhibit the opposite tendency, and circular motion will not fall into either category.

Figure 5C:
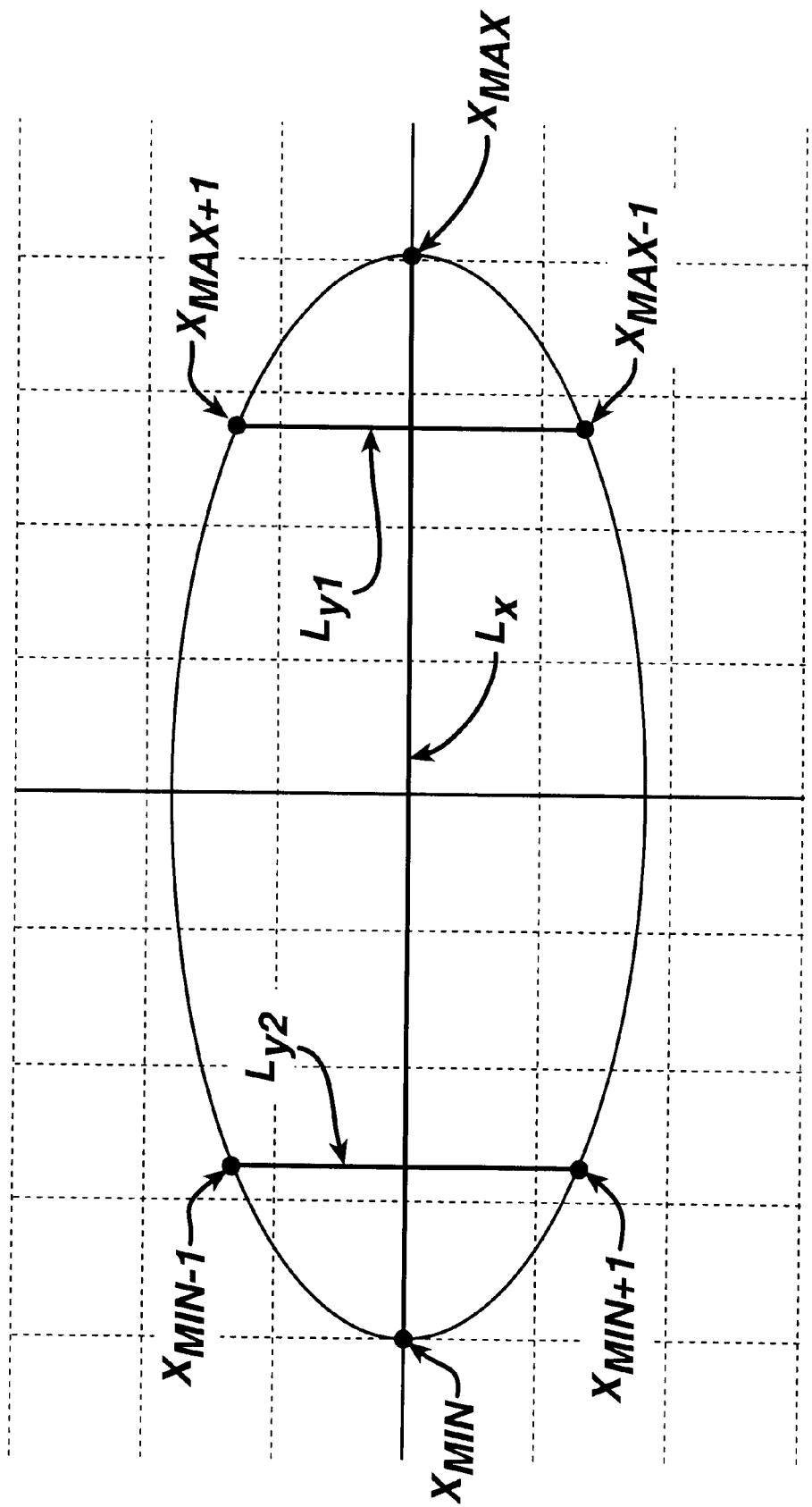
Figure 6:
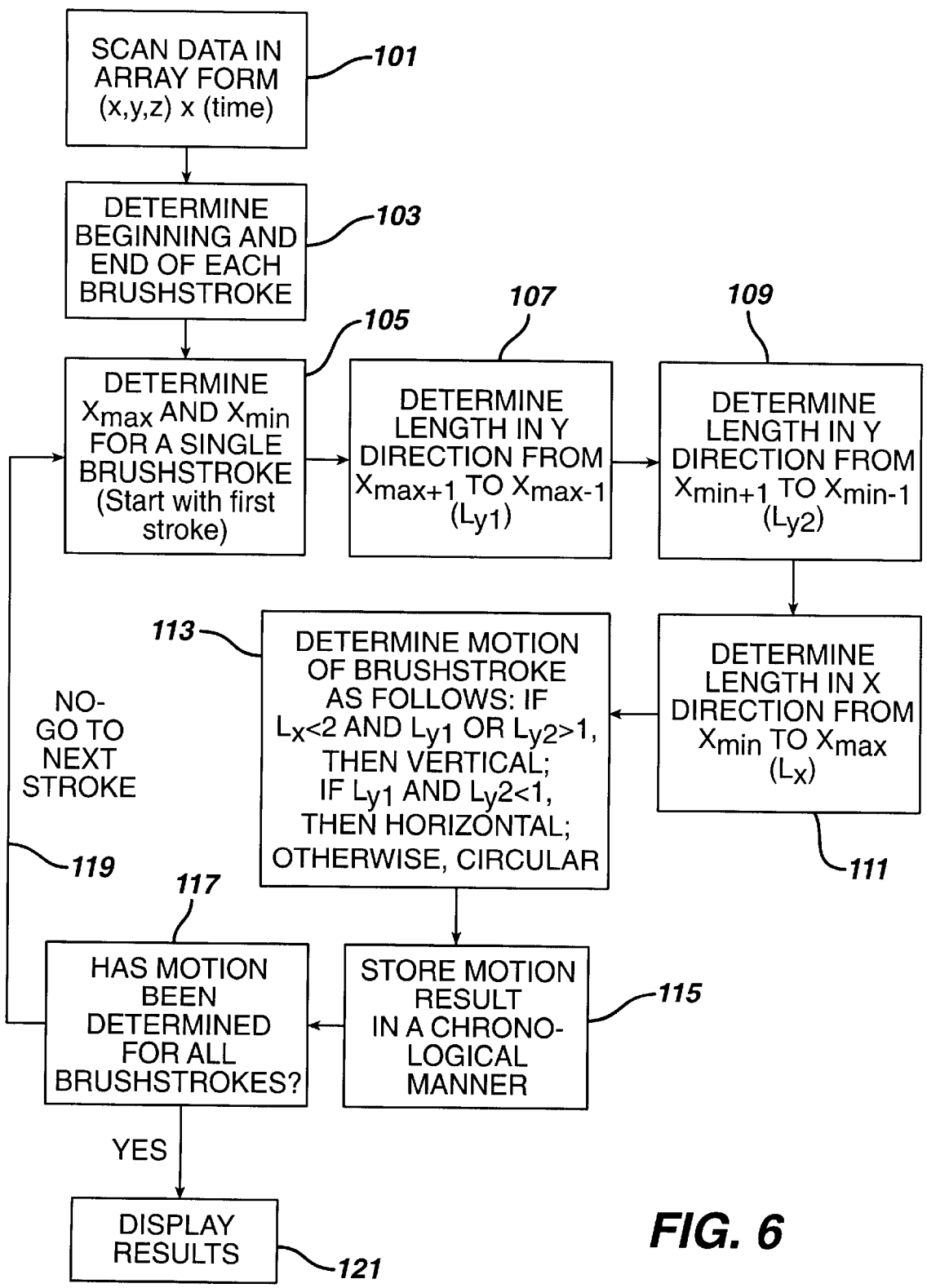
FIG. 6 is a flow diagram of steps followed by a microprocessor to determine a user's brushing motion based on data obtained from an accelerometer of the toothbrush of FIG. 1.
Figure 6A:
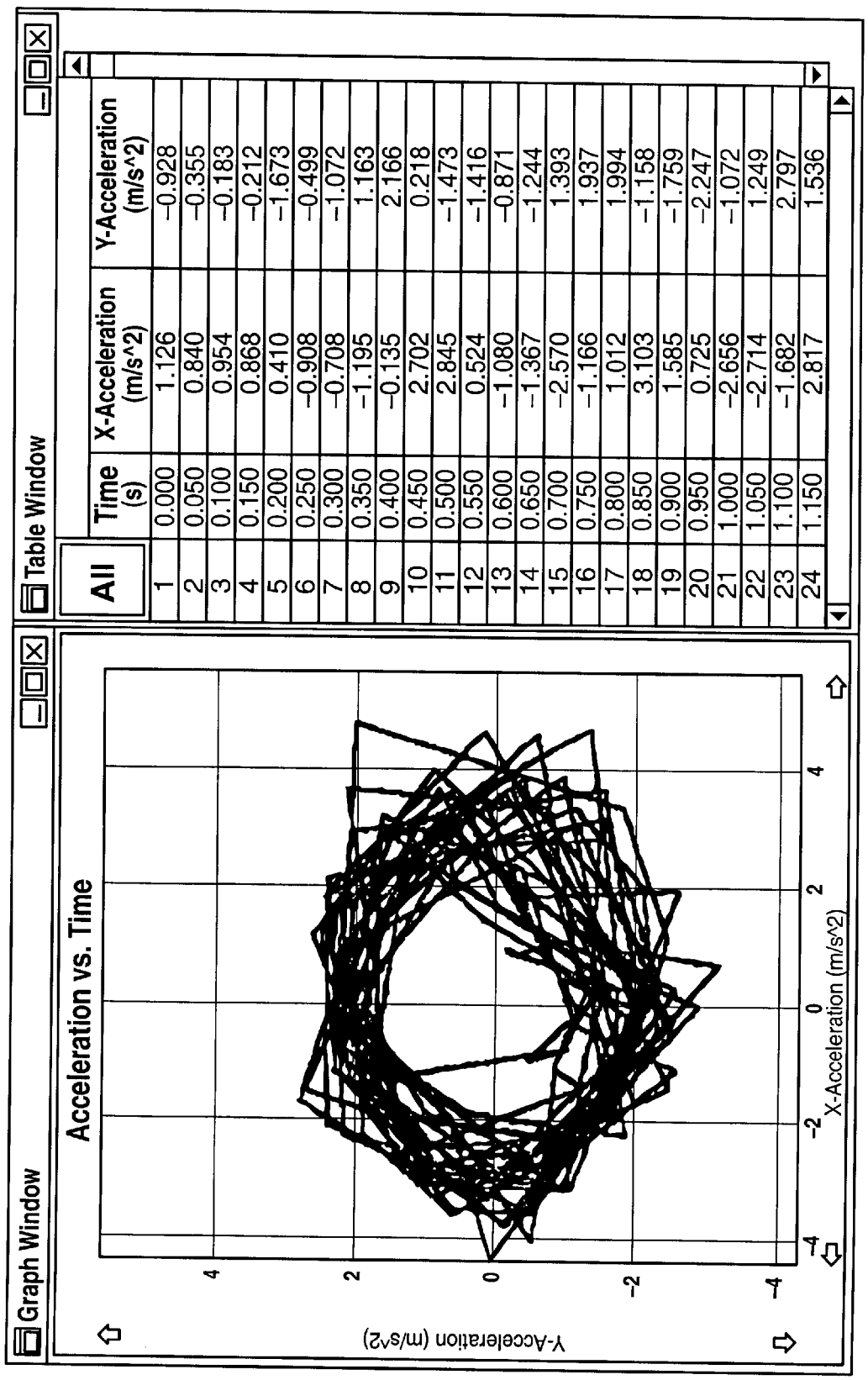
FIG. 6A is a spreadsheet and graph showing an example of data that would be used in the algorithm of FIG. 6.

A flow diagram for the algorithm for determining brushing motion is shown in FIG. 6. The algorithm is discussed below with reference to FIGS. 5–5C and 6–6B.

First, the x and y acceleration data, in tabulated form, is scanned (101) from memory into an array (e.g., the spreadsheet table discussed above and shown in FIG. 6A). The array stores the numerical values from each cell in memory (e.g., RAM memory of a PC or memory card) in a form that facilitates the following calculations. Next, the beginning and end of each brushstroke is determined (103) by scanning the data, in chronological order, for maximum and minimum x values (see FIG. 6B). The first minimum discovered during the scanning is noted as the first $x_{min}$ and considered to be the start of the first brushstroke. The first maximum x value following the first minimum x value is located and construed to be the middle of the first brushstroke (where brushing motion changes from one direction to the other). The next $x_{min}$ value indicates the end of the first brushstroke and the beginning of the next brushstroke. The computer records the data for each brushstroke and continues on through the data to find the next brushstroke, recording each successive brushstroke in memory.

Referring to FIGS. 6 and 5C, for the first brushstroke, the maximum and minimum values of the x coordinate ($x_{max}$ and $x_{min}$) are determined (105). The Y-direction lengths, $L_{y1}$ and $L_{y2}$, between the data points just before and just after each of $x_{max}$ and $x_{min}$ ($x_{max+1}$, $x_{max-1}$, and $X_{min+1}$, $x_{min-1}$) are then determined (107, 109). The length $L_x$ along the x axis, between $x_{max}$ and $x_{min}$, is also determined (111).

Once these values have been obtained, they are used to determine the motion of the brushstroke (113) as follows:

If $L_x$ is less than 2 and either $L_{y1}$ or $L_{y2}$ is greater than one (e.g., as would be the case in FIG. 5A), then the motion is construed to be vertical.

If $L_{y1}$ and $L_{y2}$ are both less than one (e.g., as would be the case in FIG. 5), then the motion is construed to be horizontal.

Otherwise, the motion is construed to be circular.

The inferred type of motion for this brushstroke is then stored chronologically in memory (115), the computer checks to see if all brushstrokes have been analyzed (117), and, if not, the next brushstroke is analyzed in the same manner (119), until the motion of each brushstroke (or each stroke in a desired portion of the brushing session) has been analyzed. The results are then displayed (121) e.g., as a table that lists the brushstrokes in chronological order and records the type of each stroke.

Figure 8:
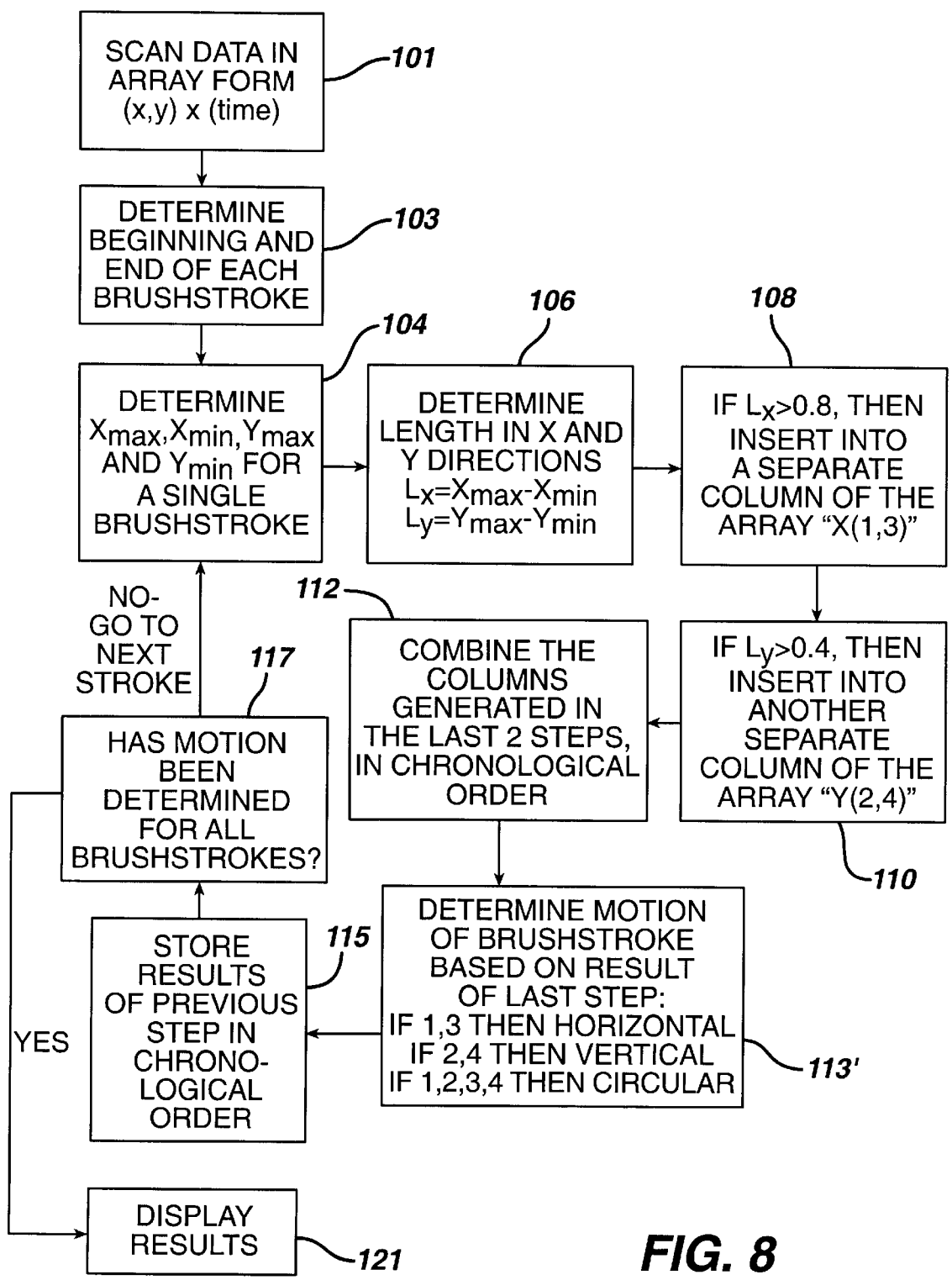
FIG. 8 is a flow diagram of steps followed by the microprocessor to determine a user's brushing motion based on data obtained from the multi-axis force sensor of the toothbrush of FIG. 7.

When the sensor configuration shown in FIGS. 7–7A is used, the force data is analyzed using the algorithm shown in FIG. 8, again to determine the sequence of brushing motions used during the brushing session. Unlike the accelerometer, the force sensor shown in FIGS. 7–7A must generally pass through a "zero" position (x=0, y=0) during each brushstroke, because the post is mounted with a bias tending to return it to a center position. Thus, over time, there can be no net average displacement of the post away from the centered position. Thus, the analysis required is somewhat simpler than that discussed above with reference to FIG. 6 because the values of $L_{y1}$ and $L_{y2}$ can be determined directly and need not be derived geometrically.

As in the previously described algorithm, the data is first scanned into an array (101) and the beginning and end of each brushstroke is determined (103). Next, $x_{max}$, $x_{min}$, $y_{max}$ and $y_{min}$ are determined for a single brushstroke (104), and $L_y$ and $L_x$ are determined ($L_y=y_{max}-y_{min}$, $L_x=x_{max}-x_{min}$)

Figure 8A:
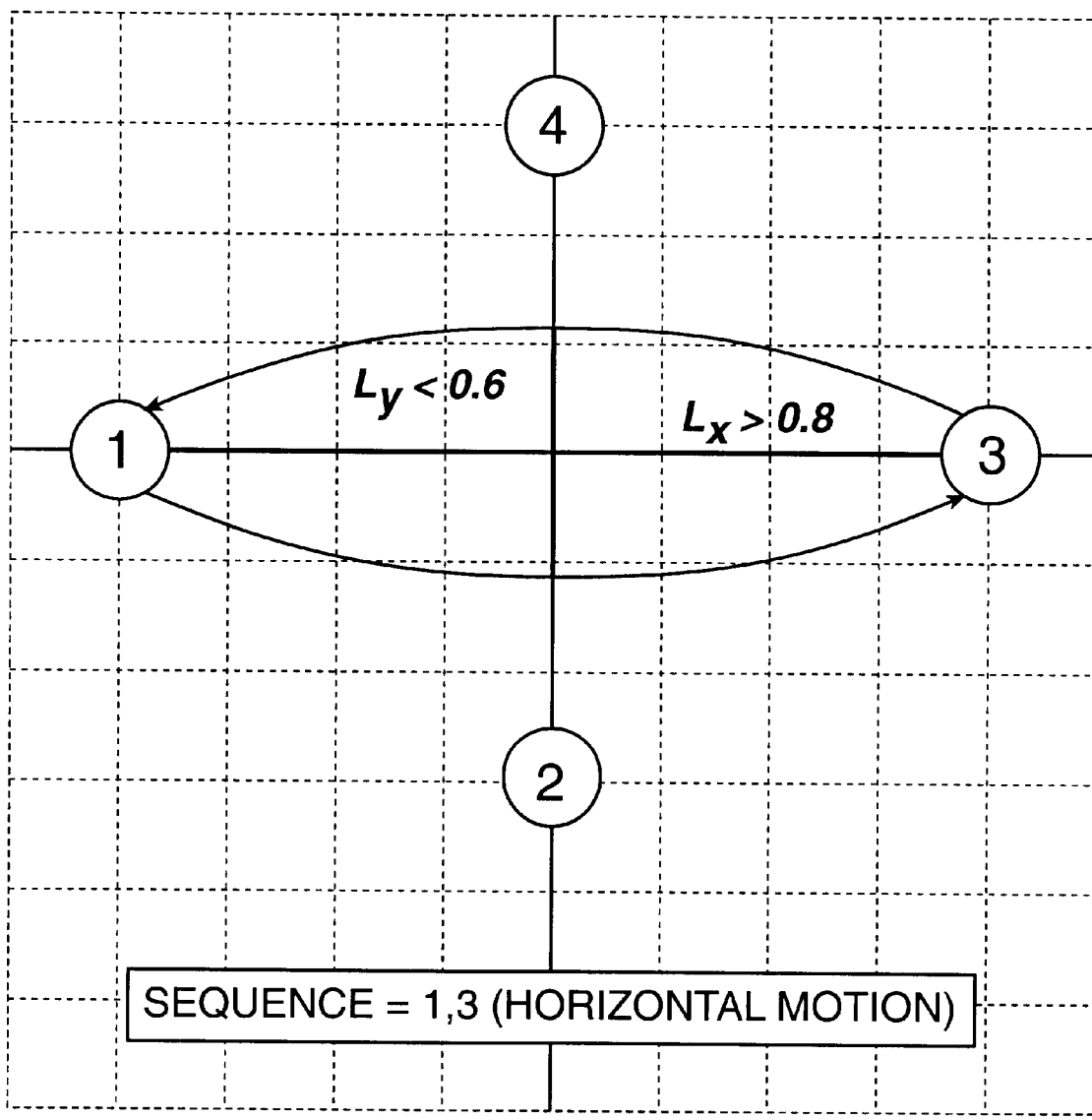
FIGS. 8A–8C are graphs showing the x-y coordinate system used in the algorithm shown in FIG. 8 for horizontal, vertical and circular motion, respectively.
Figure 8B:
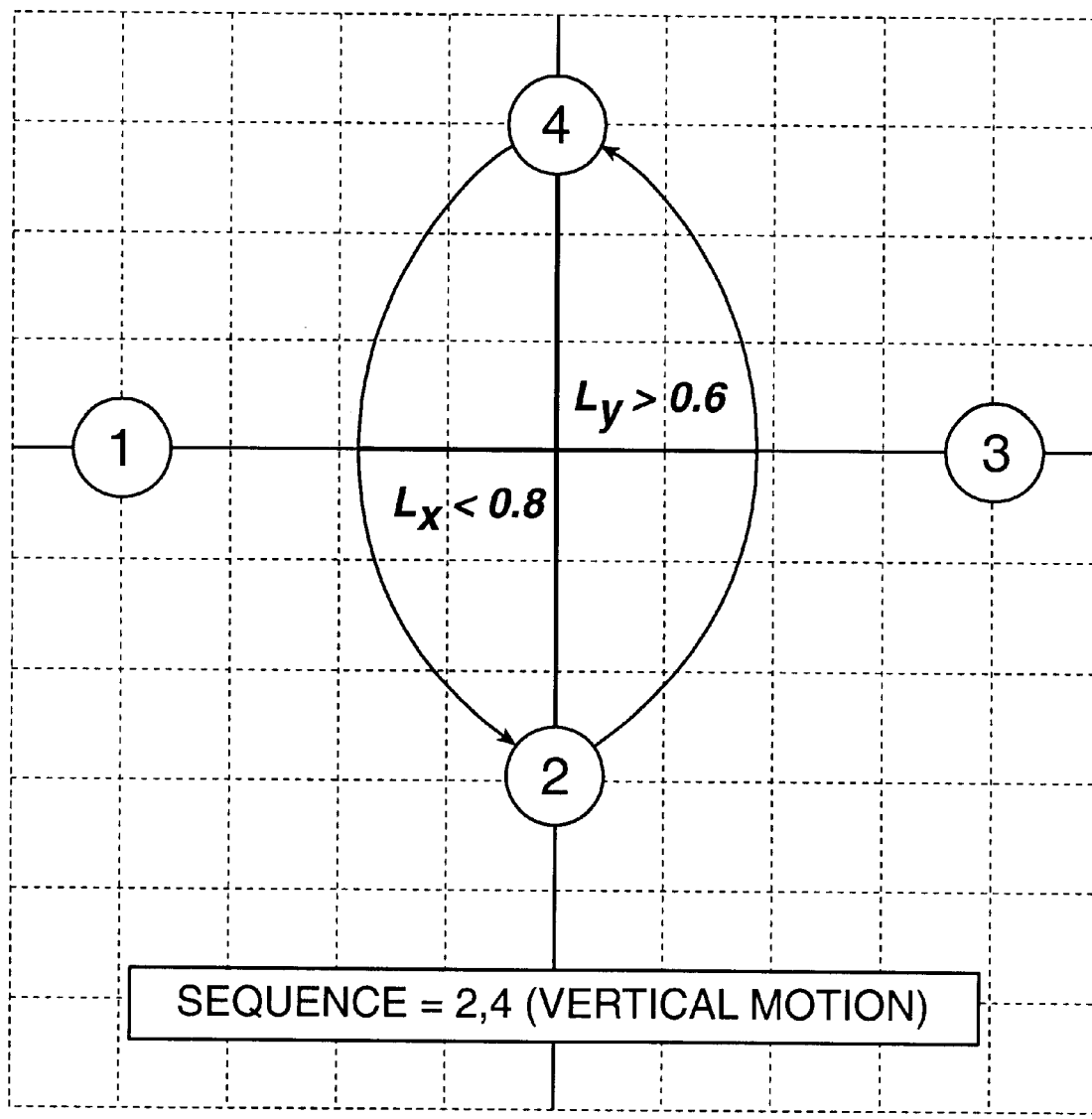
Figure 8C:
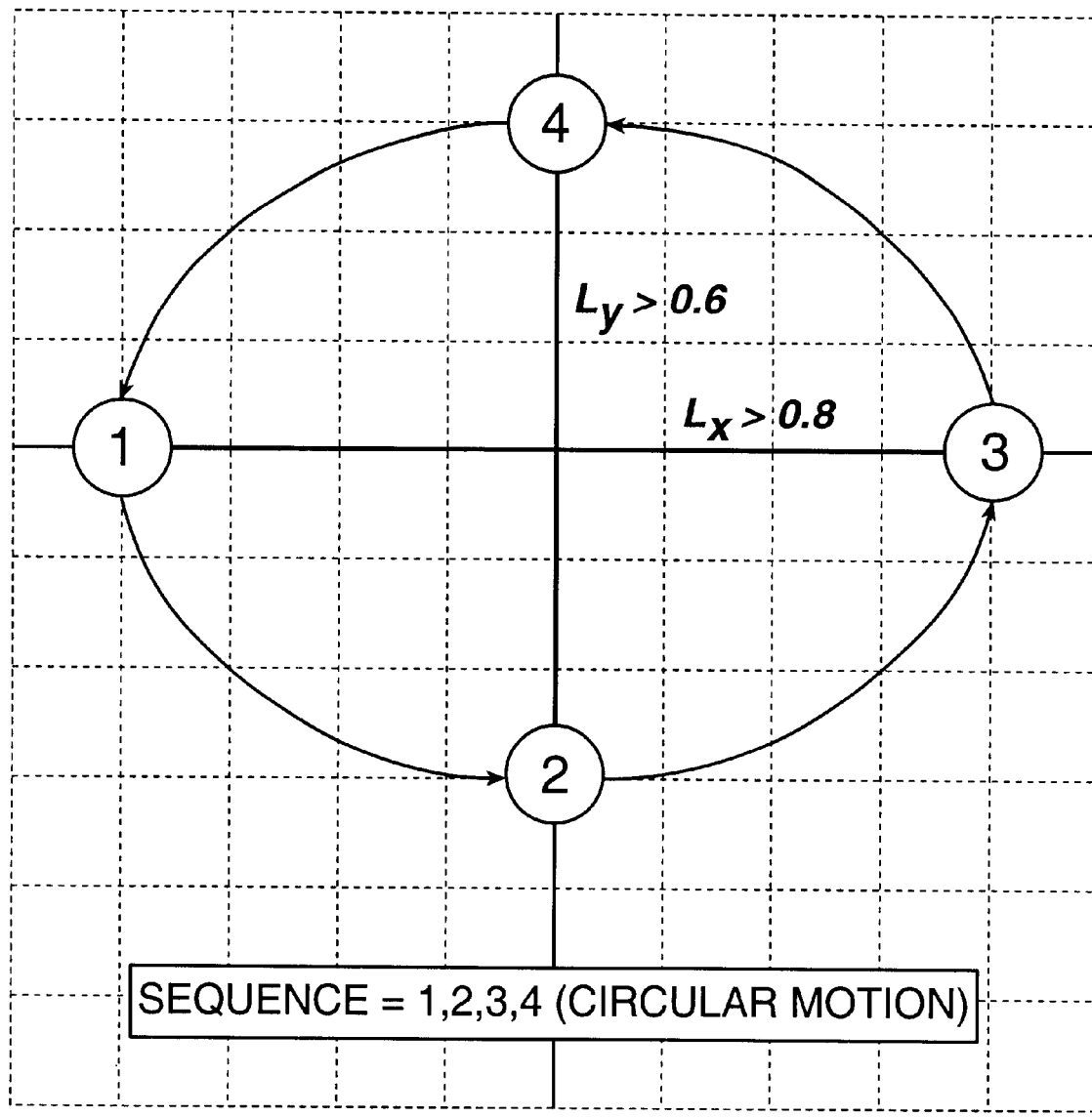

(106). Then, two new columns of the array are created (see "Array A" and "Array B", FIG. 8D), to hold a sequence of numbers between 1 and 4 (these numbers represent x,y coordinates, as shown in FIGS. 8A–8C). Numbers are placed in the columns (108, 110) in time sequence, i.e., in the order in which the data was sampled, according to the following criteria.

For a given brushstroke, if $L_x$ is greater than 0.8 (an arbitrary threshold value selected to filter out small movements in the x direction), then the numbers 1,3 are entered in the first new column of the array ("Array A"), associated with the time at which $x_{max}$ and $x_{min}$ were reached, to indicate horizontal motion of the brush. For the same brushstroke, if Ly is greater than 0.4 (again an arbitrary "filter" value), then the numbers 2,4 are added to the second new column of the array ("Array B") in the same manner, to indicate vertical motion. Next, the two columns are combined (112), preserving the time sequence of the numbers, to form a new column ("Array C", FIG. 8D), containing the chronological sequence of numbers.

The sequence of numbers in the "Array C" column is then examined, and the stroke motion for each brushstroke is determined (113'), as follows:

If the number sequence is 1,3,1,3 the stroke is generally horizontal (see arrows, FIG. 8A).

If the number sequence is 2,4,2,4 the stroke is generally vertical (see arrows, FIG. 8B).

If the number sequence is 1,2,3,4, the stroke is generally circular (see arrows, FIG. 8C).

The rest of the algorithm proceeds in the same manner discussed above with respect to the algorithm shown in FIG. 6.

Data obtained from the gyroscope, if one is used, typically does not require a complex analysis. To determine which side of the mouth is being brushed at a particular time, the gyroscope data is scanned to determine when the rotational orientation is greater than 180 degrees, indicating the left side, and when it is less than 180 degrees, indicating the right side. As explained above, top and bottom and gum brushing information can also be obtained, without any calculations, simply by examining the data.

Data Output

The time sequence of data that is acquired during toothbrushing and analyzed as discussed above can be used in a wide variety of ways.

The data can be presented, in an abbreviated form, to the user on a read-out on the toothbrush or toothbrush holder, to provide the user with immediate feedback concerning brushing performance. For example, the data can be presented as shown in FIGS. 3 or 4. In FIG. 3, the toothbrush display 26 is a small rectangular window having an LCD or LED display. The user can scroll through the possible display information (shown in the boxes on the right hand side of FIG. 3) by depressing the on/off/option button 60 on the toothbrush handle. Thus, the user can view a grade for the brushing session, the duration of the session, the average brushing pressure, and the number and percentage of horizontal, vertical and circular brush strokes by repeatedly depressing button 60. If a larger display screen is provided, e.g., on the toothbrush, the toothbrush holder, or a portable computer screen, this information can be shown in a single screen format, and the data can be broken down by region of the mouth, as shown in FIG. 4. The displays shown in FIGS. 3 and 4 are merely examples of the many possible formats in which the data can be displayed.

Using software loaded on the user's PC, the data can be presented to the user in the form of tables and/or graphs. The information presented can include, for example: (a) the percentage of time spent using different brushing motions, e.g., horizontal, vertical and circular, (b) the percentage of time spent brushing each side and the front of the teeth, (c) the total duration of the session, and (d) a comparison between these parameters and predetermined recommended values. The data for a number of brushing sessions can also be compared and comparative data displayed in the form of graphs or other suitable manner, e.g., as a historical chart depicting progress and improvement.

The data can also be used to generate an animated graphic representation of the brushing session, in which a graphical element representing a toothbrush moves over a graphical element representing the teeth, in accordance with the data acquired during the brushing session. This movement is provided by software that sequentially moves the position of the graphical representation of the toothbrush to the x,y coordinates that were acquired during data acquisition. If three-dimensional movement of the graphical element is desired, the region of the mouth being brushed is determined based on the readings from the gyroscope and light sensor that have been analyzed to determine when left-right shifts in brushing were made during the session. The animation can also include a graphic indication of changes in brushing pressure, and an alarm, e.g., a sound or color change when a predetermined brushing pressure is exceeded.

These tables, graphs and animations can be viewed and studied by, for example, the toothbrush user, the user's parents, if the user is a child, a dental professional, and/or a toothbrush manufacturer such as ORAL B. The toothbrush user can go to a toothbrush manufacturer's website, transmit the data from one or more brushing sessions, and then receive customized information from the manufacturer, e.g., regarding suitable toothbrush designs for use with the user's particular brushing technique. The data provided by the user can also be used by the manufacturer in the design of new toothbrushes that are optimized for particular common brushing techniques, e.g., in clinical studies and/or market research.

The data can also be input into a game designed to motivate children to brush their teeth, which may be provided via a website or software loaded on the user's PC.

Data from multiple brushing sessions may be collected and used to compile a history of the user's brushing habits over an extended period of time, enabling the user's dentist to better understand patient compliance issues. The dentist can review the data with the user and view the animations of the user's brushing sessions during an office visit, allowing the dentist to better instruct the user in proper brushing technique. The dentist can also review the patient's brushing history over time, to determine whether the patient's brushing technique is improving. If data is provided regarding toothbrush wear (as discussed above) the dentist can discuss the need for toothbrush replacement with the patient, and/or provide a replacement during the office visit.

Other embodiments are with-in the claims.

For example, the toothbrush holder may include a microprocessor, power source, and data storage system, and the toothbrush may be attached to the holder by a cord, so that the toothbrush need only contain a sensor and a device for transmitting the sensed data to the holder via the cord.

Figure 10:
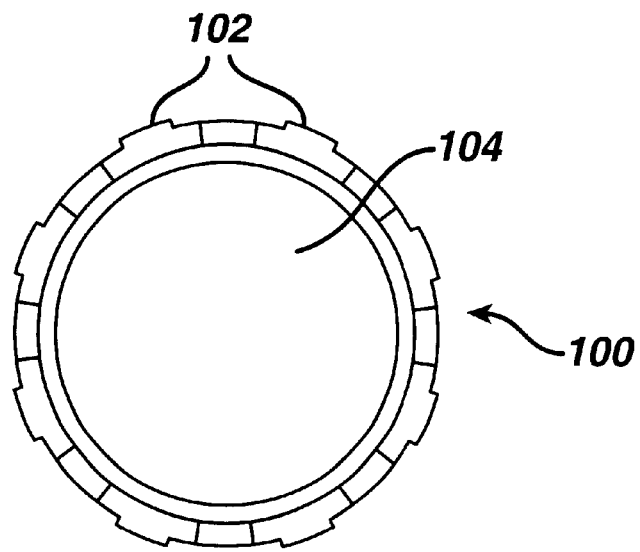
FIG. 10 is a diagrammatic radial cross-sectional view of a motion sensor according to an alternative embodiment of the invention.
Figure 10A:
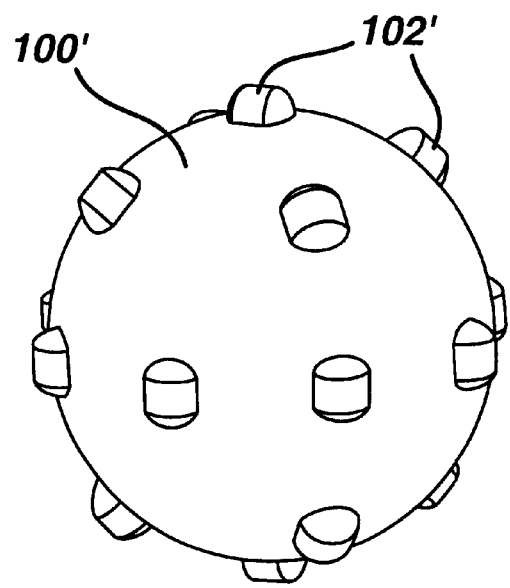
FIG. 10A is a diagrammatic perspective view of another alternative sensor.

Moreover, other types of sensors can be used to acquire data regarding brushing motion. For instance, the accelerometer can be replaced by a hollow, flattened cylindrical tube or a hollow sphere containing a small object and including proximity sensors on the outside of the tube, as shown in FIGS. 10 and 10A respectively. The object bounces around in the tube or sphere when the toothbrush is in use and the proximity sensors detect its motion. As shown in FIG. 10, if a tube is used (tube 100), the object is a metal puck (shaped generally like a miniature hockey puck), and eight proximity sensors 102 are mounted at 45 degrees from each other around the circumference of the tube, to measure two-dimensional motion of puck 104. If as shown in FIG. 10A, a sphere is used, the object is a ball (not shown), and 18 proximity sensors 102' are mounted with even spacing over the surface of the sphere 100', to measure three-dimensional motion of the ball.

In addition, the sensors described above can be used to obtain other types of data. For example, the gyroscope that is used to measure large-scale rotational movement of the brush (indicating a shift from one side of the mouth to the other) can also be used to detect small-scale rotational movement, indicating rotation of the brush against the teeth during brushing. This additional data can be included in the evaluation of the patient's brushing technique, and in the visual display of the brushing session.

Figure 11:
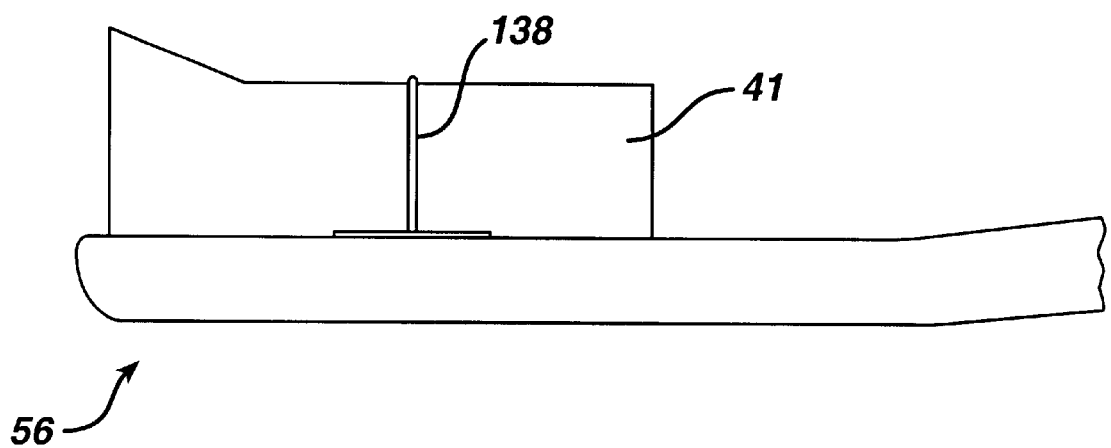
FIG. 11 is a diagrammatic side view of a toothbrush head according to an alternate embodiment of the invention.

Additionally, a multi-axis force sensor, of the type described above, can be provided in which post 38 is replaced by a bristle-like element 138, e.g., a rubber-coated wire. This sensor is mounted among the toothbrush bristles 41, as shown in FIG. 11, so that bending of the bristle-like element is representative of bending of the adjacent bristles. This type of sensor would be used in the manner described above to determine brushing motion and pressure. To provide for brush-head replaceability, the bristles can be mounted on a module (as discussed above with reference to FIG. 7) and the bristle-like sensor can extend through an aperture in the module into the bristle region.

Figure 12:
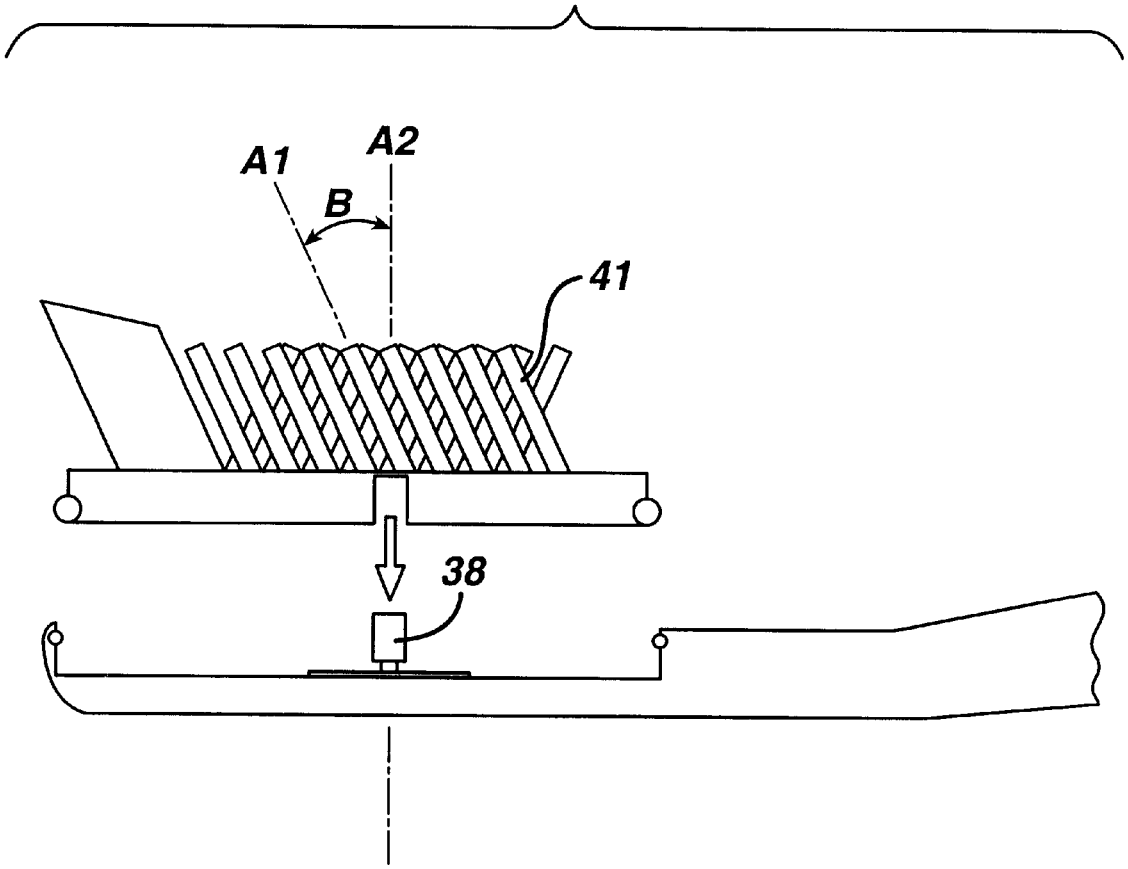
FIG. 12 is a diagrammatic side view of a toothbrush head according to another alternate embodiment of the invention.

Moreover, although the bristles 40 are substantially perpendicular to the brush handle in the embodiments described above and shown in the figures, other bristle geometries and brush designs may be used. For example, as shown in FIG. 12, the bristles may be angled with respect to the head region of the brush handle. Regardless of the angle of the bristles, the post of the sensor shown in FIGS. 7–7C will be positioned so that it is generally perpendicular to the tooth surface during brushing (for most brush designs, this position will be perpendicular to the longitudinal axis of the brush handle). As a result, if the bristles are angled with respect to the base on which they are mounted, the sensor will be positioned at a corresponding angle with respect to the longitudinal axes of the shafts of the bristles. Referring to FIG. 12, the longitudinal axis (A1) of the bristles defines an angle B with respect to the longitudinal axis (A2) of the post 38 of the sensor. Angle B is typically from about 0 to 45 degrees.

What is claimed is:

1. A toothbrush comprising
   a handle, a neck,
   brush region extending from said neck, the brush region including brushing elements extending from a base,
   a motion sensor disposed in said brush region, and
   a data storage device for storing data that is sensed by the sensor.

2. The toothbrush of claim 1 wherein said brush region further includes a back portion, said sensor is mounted on said back portion, and said base is removably mounted on a portion of said sensor extending from said back portion.

3. The toothbrush of claim 1 wherein said brushing elements and said base together comprise a removable modular unit.

4. The toothbrush of claim 3 wherein said modular unit is replaceable.

5. The toothbrush of claim 4 wherein said sensor is permanently mounted on the toothbrush, and said modular unit removably engages a portion of said sensor.

6. The toothbrush of claim 4 further comprising an aperture in said base, wherein an elongated portion of said sensor extends through the aperture and into said brushing elements.

7. The toothbrush of claim 6 wherein the brushing elements comprise bristles and the longitudinal axis of said elongated portion extends at an angle of from about 0 to 45 degrees with respect to the long axes of at least some of the bristles.

8. The toothbrush of claim 6 wherein said elongated portion comprises a bristle-like element.

9. The toothbrush of claim 8 wherein said sensor is constructed to measure a bending moment of the elongated portion when force is applied by the user to the teeth during brushing.

10. The toothbrush of claim 9 wherein the sensor measures bending moments in multiple directions.

11. The toothbrush of claim 1 further comprising a rotation sensor constructed to measure rotation of the toothbrush.

12. The toothbrush of claim 11 wherein said rotation sensor comprises a gyroscope.

13. The toothbrush of claim 1, further comprising a modem for transmitting data that is sensed by the sensor to a remote computer.

14. The toothbrush of claim 13 wherein the modem comprises a wireless modem.

15. The toothbrush of claim 1, further comprising a data evaluation device constructed to analyze said data.

16. The toothbrush of claim 1 further comprising a display for displaying information regarding a brushing session.

17. The toothbrush of claim 1 further comprising a microprocessor connected to said sensor.

18. A toothbrush comprising
   a body,
   a plurality of bristles extending from a portion of the body, and
   a sensor constructed to generate a time sequence of data associated with orientation of the toothbrush, the sensor comprising five strain gages, two of which measure movement in an x-direction, two of which measure movement in a y-direction, and the fifth of which measures pressure in the z-direction, wherein the sensor is capable of measuring pressure exerted by the bristles on a user's teeth in the z-direction, independently of pressure in the x and y directions that is indicative of motion, to enable a determination of the motion of the toothbrush independently of the force applied by the user to the teeth during brushing.

19. A toothbrush comprising
   a handle, a neck,
   a brush region extending from said neck, the brush region including brushing elements extending from a base, said base including an aperture, and
   a motion sensor disposed in said brush region, an elongated portion of said sensor extending through the aperture and into said brushing elements.

20. The toothbrush of claim 19 wherein the brushing elements comprise bristles and the longitudinal axis of said elongated portion extends at an angle of from about 0 to 45 degrees with respect to the long axes of at least some of the bristles.

21. The toothbrush of claim 20 wherein said elongated portion comprises a bristle-like element.

22. The toothbrush of claim 19 wherein said sensor is constructed to measure a bending moment of the elongated portion when force is applied by the user to the teeth during brushing.

23. A toothbrush comprising a handle, a neck, a brush region extending from said neck, the brush region including brushing elements extending from a base, a motion sensor disposed in said brush region, and a rotation sensor constructed to measure rotation of the toothbrush.

24. A toothbrush comprising a handle, a neck, a brush region extending from said neck, the brush region including brushing elements extending from a base, a motion sensor disposed in said brush region, and a modem for transmitting data that is sensed by the sensor to a remote computer.

* * * * *

UNITED STATES PATENT AND TRADEMARK OFFICE
CERTIFICATE OF CORRECTION

PATENT NO.      : 6,536,068 B1
DATED           : March 25, 2003
INVENTOR(S)     : Casper W. Chiang and Andy Yang It is certified that error appears in the above-identified patent and that said Letters Patent is hereby corrected as shown below:

<u>Title page,</u>
Item [56], References Cited, U.S. PATENT DOCUMENTS, delete
"4,598,437 A   7/1986  Ernest et al." and insert -- 4,598,437 A   7/1996  Ernest et al. --.
Under OTHER PUBLICATIONS, delete "Allen C. eta al." and insert
-- Allen C. et al. --.

<u>Column 11,</u>
Line 56, insert -- a -- before the word "brush".

Signed and Sealed this

Twenty-third Day of March, 2004

JON W. DUDAS
*Acting Director of the United States Patent and Trademark Office*